(12) United States Patent
Tishkov et al.

(10) Patent No.: US 8,519,035 B2
(45) Date of Patent: Aug. 27, 2013

(54) CYCLIC PHOSPHINES AS FLAME RETARDANTS

(75) Inventors: Alexander Tishkov, Moskau (RU); Gunter Scherhag, Brig (CH); Klemens Massonne, Bad Dürkheim (DE); Matthias Maase, Mendham, NJ (US); Calvin Emanuel, Houston, TX (US); Larry D. Timberlake, West Lafayette, IN (US); Mark V. Hanson, West Lafayette, IN (US)

(73) Assignee: BASF SE, Ludwigshafen (DE)

( * ) Notice: Subject to any disclaimer, the term of this patent is extended or adjusted under 35 U.S.C. 154(b) by 363 days.

(21) Appl. No.: 12/676,495

(22) PCT Filed: Sep. 3, 2008

(86) PCT No.: PCT/EP2008/061625
§ 371 (c)(1),
(2), (4) Date: Mar. 10, 2011

(87) PCT Pub. No.: WO2009/030708
PCT Pub. Date: Mar. 12, 2009

(65) Prior Publication Data
US 2011/0263764 A1     Oct. 27, 2011

Related U.S. Application Data

(60) Provisional application No. 60/969,753, filed on Sep. 4, 2007.

(51) Int. Cl.
*C08K 5/49* (2006.01)
(52) U.S. Cl.
USPC .......................................... 524/115; 524/116
(58) Field of Classification Search
USPC ........................................................ 524/115
See application file for complete search history.

(56) References Cited

U.S. PATENT DOCUMENTS

| | | | |
|---|---|---|---|
| 4,111,899 A * | 9/1978 | Baggett et al. | 524/120 |
| 4,210,630 A | 7/1980 | Dany et al. | |
| 4,325,863 A | 4/1982 | Hinsken et al. | |
| 4,338,244 A | 7/1982 | Hinsken et al. | |
| 5,175,312 A | 12/1992 | Dubs et al. | |
| 5,216,052 A | 6/1993 | Nesvadba et al. | |
| 5,252,643 A | 10/1993 | Nesvadba | |
| 5,356,966 A | 10/1994 | Nesvadba | |
| 5,367,008 A | 11/1994 | Nesvadba | |
| 5,369,159 A | 11/1994 | Nesvadba | |
| 5,428,162 A | 6/1995 | Nesvadba | |
| 5,428,177 A | 6/1995 | Nesvadba | |
| 5,488,079 A | 1/1996 | Staniek | |
| 5,844,029 A | 12/1998 | Prabhu et al. | |
| 5,880,191 A | 3/1999 | Prabhu et al. | |
| 6,096,854 A | 8/2000 | Morris et al. | |
| 6,369,140 B1 * | 4/2002 | Staniek | 524/116 |
| 6,864,304 B2 | 3/2005 | Staniek | |
| 2004/0249022 A1 | 12/2004 | Su | |

FOREIGN PATENT DOCUMENTS

| | | |
|---|---|---|
| DE | 4316611 A1 | 11/1993 |
| DE | 4316622 A1 | 11/1993 |
| DE | 4316876 A1 | 11/1993 |
| DE | 19638924 A1 | 4/1997 |
| EP | 0589839 A1 | 3/1994 |
| EP | 0591102 A1 | 4/1994 |
| EP | 0595413 A1 | 5/1994 |
| EP | 0678376 A1 | 10/1995 |
| GB | 2306478 A | 5/1997 |
| WO | WO-2004/050668 A1 | 6/2004 |
| WO | WO-2006/074983 A1 | 7/2006 |

* cited by examiner

*Primary Examiner* — Hui Chin
(74) *Attorney, Agent, or Firm* — Novak Druce Connolly Bove + Quigg LLP

(57) ABSTRACT

The present invention is related to the use of specific cyclic and/or polymeric aryl-phosphines as flame retardants and to a method for reducing the flammability of organic material by incorporating into the material these specific cyclic and/or polymeric phosphines. Moreover, the invention is related to a polymeric composition containing a polymeric material and at least one of the specific cyclic and/or polymeric phosphines in an amount of from 1 to 15% by weight, based on the weight of the polymeric material. The invention also relates to a composition comprising at least one of the specific cyclic and/or polymeric phosphines and at least one polymerizable monomer.

9 Claims, No Drawings

CYCLIC PHOSPHINES AS FLAME RETARDANTS

CROSS-REFERENCE TO RELATED APPLICATIONS

This application is a national stage application (under 35 U.S.C. §371) of PCT/EP2008/061625, filed Sep. 3, 2008, which claims benefit of U.S. application 60/969,753, filed Sep. 4, 2007.

BACKGROUND OF THE INVENTION

The present invention is related to the use of specific cyclic and/or polymeric aryl-phosphines as flame retardants and to a method for reducing the flammability of organic material by incorporating into the material these specific cyclic and/or polymeric phosphines. Moreover, the invention is related to a polymeric composition containing a polymeric material and at least one of the specific cyclic and/or polymeric phosphines in an amount of from 1 to 15% by weight, based on the weight of the polymeric material. The invention also relates to a composition comprising at least one of the specific cyclic and/or polymeric phosphines and at least one polymerizable monomer.

Flame resistance is a significant property for organic materials, such as wood, primarily timber, paper, paperboard, textiles, flammable performance liquids and in particular polymeric materials. In some applications, flame resistance is given first priority due to the danger to human beings and material assets, for example in structural materials for airplane and motor vehicle construction and for public transportation vehicles. In electronic applications, flame resistance is necessary because the components may generate localized high temperatures. Therefore, a high level of flame/fire protection is warranted.

Accordingly, it has been customary to incorporate into organic materials and in particular into polymeric materials flame retardants.

The flame retardant market today is comprised of products which function to interfere with the combustion process by chemical and/or physical means. Mechanistically, these flame retardants have been proposed to function during combustion of an article either in the gas phase, the condensed phase or both.

The most common flame retardants thus far used commercially have been halogen containing compounds such as tetrabromobisphenol A, decabromodiphenyl oxide, de-cabromodiphenyl ethane, brominated carbonate oligomers, brominated epoxy oligomers, and poly(bromostyrenes). The organohalogens are proposed to generate halogen species (e.g. HX) which interfere in the gas phase with free radical organic "fuel" from the polymer substrate.

Generally, halogen containing fire retardants such as those listed above are considered to be safe and effective. However, there has been increasing interest to utilize halogen-free flame retarding substances. It is desirable for the materials equipped with these compounds to be able to meet the requirements of fire retardancy and to display the same or better properties, such as mechanical resistance, toughness, solvent and moisture resistance, etc. that is offered with the halogenated materials currently used.

Many different approaches have been investigated to flame retard organic polymers without the use of halogens (for recent reviews see: Journal of Fire Sciences 24, 345-364, 2006; Journal of Fire Sciences 22, 251-264, 2004; Polymer International 54, 11-35, 2005; Polymer International 54, 981-998, 2005).

One general approach to using non-halogen flame retardants in organic polymer materials is by the use of phosphorus based flame retardants. In polyamide systems, red phosphorus has been well-established in glass-reinforced polyamide 66 resins (Weil, E. D. Red Phosphorus—an Update, Paper in 11$^{th}$ Annual BCC Conference of Flame Retardancy, Jun. 1-3, 1998). The color of the final product and the handling of red phosphorus are concerns with this approach that need to be dealt with. More recently, for polyamides, the uses of various salts of dialkylphosphinic acids have been promoted by Clariant under the Exolit® name.

The use of melamine based materials has been used in certain polyamide resin systems. For unreinforced polyamide 66, melamine cyanurate is used (Stern and Horacek Intern. J. Polymeric Mater. 25, 255-268, 1994; Casu, Camino, et al., Polym. Degrad. Stabil., 58, 297-302, 1997). This material is believed to work by providing enhanced non-burning drips and also by undergoing an endothermic decomposition to produce a non-combustible vapour. However, melamine cyanurate has difficulty achieving a V-0 flame retardant classification when glass-filled polyamide 66 is used. In that case, melamine pyrophosphate has been shown to be effective at a higher 28% loading with a 20% glass system (Kasowski, et al., New Advances in Flame Retardant Technology, Paper presented at FRCA, p 23, 1999).

In polycarbonate blends, various aromatic phosphates are usually the products of choice. Standard example materials would be resorcinol bis(diphenyl phosphate) or bisphenol A bis(diphenyl phosphate). In polyesters, a wide variety of phosphorus-based materials has been investigated (Polymer International 54, 981-998, 2005). These materials range from phosphine oxides to phosphates and all have certain advantages and disadvantages.

Another approach to enhance flame retardancy is to add flame retardant adjuvants to organic materials, in particular to polymeric materials, which prevent dripping during the fire. This is most commonly accomplished by adding low levels of polytetrafluoroethylene. Dripping during combustion is the process of the separation of parts of the polymer from the matrix in the shape of droplets. Most often, the droplets are flaming and are imposing tremendous danger for fire spread. A further common measure to add fillers such as talc in large amounts to the polymer, with some negative consequences on the mechanical properties. Fillers sometimes used include calcium carbonate, magnesium carbonate, zinc borate, silicates, silicones, glass fibres, glass bulbs, asbestos, kaolin, mica, barium sulfate, calcium sulfate, metal oxides, hydrates and hydroxides such as zinc oxide, magnesium hydroxide, aluminum trihydrate, silica, calcium silicate and magnesium silicate.

BRIEF SUMMARY OF THE INVENTION

It is an object of the present invention to provide halogen-free flame retardants which can be applied in most organic materials and which are effective and economic and which do not show the disadvantages of the known systems.

It has been found that specific cyclic and polymeric phosphines impart good flame retarding properties to materials equipped therewith.

Accordingly, the present invention relates to the use of at least one cyclic phosphine of the formula I

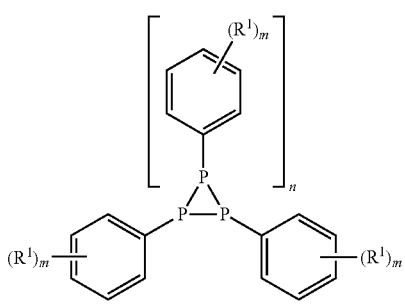

and/or of at least one polymer containing, preferably at least three, repeating units of the formula II

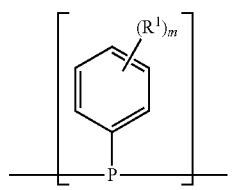

where
each $R^1$ is independently selected from the group consisting of hydroxy, $C_1$-$C_{10}$-alkyl, $C_1$-$C_{10}$-alkoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_4$-alkyl, $C_6$-$C_{10}$-aryl-$C_1$-$C_4$-alkoxy, $NR^2R^3$, $COR^2$, $COOR^2$ and $CONR^2R^3$;
each $R^2$ is independently selected from the group consisting of hydrogen, $C_1$-$C_{10}$-alkyl, $C_3$-$C_{10}$-cycloalkyl, $C_6$-$C_{10}$-aryl and $C_6$-$C_{10}$-aryl-$C_1$-$C_4$-alkyl;
$R^3$ independently has one of the meanings given for $R^2$;
m is 0, 1, 2 or 3; and
n is an integer from 1 to 6,
as flame retardants, with the exception of their use in epoxy resins or epoxy resins containing materials.

DETAILED DESCRIPTION OF THE INVENTION

In the terms of the present invention, flame retardants are understood to be substances which reduce the flammability of substrates which are equipped with them. They are active during the starting phase of a fire by enhancing the resistance of the flame-retarded material to decomposition by thermal stress and/or by preventing the spread of a source of ignition to the flame-retarded material, thus preventing, delaying or inhibiting the spread of a fire.

Compounds I are 3- (n=1) to 8-membered (n=6) cyclic phosphines, the ring members all being phosphorus atoms which are substituted by phenyl carrying m $R^1$ groups.

Polymers containing repeating units of the formula II can be linear or branched oligomers or polymers.

In the terms of the present invention, $C_1$-$C_4$-alkyl refers to a branched or straight-chain saturated hydrocarbon group having 1 to 4 carbon atoms. Examples therefor are methyl, ethyl, propyl, 1-methylethyl(isopropyl), butyl, 1-methylpropyl(sec-butyl), 2-methylpropyl(isobutyl) and 1,1-dimethylethyl(tert-butyl).

$C_1$-$C_6$-alkyl refers to a branched or straight-chain saturated hydrocarbon group having 1 to 6 carbon atoms. Examples therefor are those listed above for $C_1$-$C_4$-alkyl and further pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl.

$C_1$-$C_8$-alkyl refers to a branched or straight-chain saturated hydrocarbon group having 1 to 8 carbon atoms. Examples therefor are those listed above for $C_1$-$C_6$-alkyl and further heptyl, octyl, 2-ethylhexyl and their positional isomers.

$C_1$-$C_{10}$-alkyl refers to a branched or straight-chain saturated hydrocarbon group having 1 to 10 carbon atoms. Examples therefor are those listed above for $C_1$-$C_8$-alkyl and further nonyl, decyl and their positional isomers.

Alkoxy refers to straight-chain or branched alkyl groups having n to m carbon atoms, e.g. 1 to 10, in particular 1 to 8 or 1 to 6 or 1 to 4 carbon atoms bonded through oxygen linkages at any C atom in the alkyl group. $C_1$-$C_4$-alkoxy is a linear or branched $C_1$-$C_4$-alkyl group bonded through an oxygen atom such as methoxy, ethoxy, propoxy, iso-propoxy, butoxy, sec-butoxy, isobutoxy and tert-butoxy. $C_1$-$C_6$-alkoxy is a linear or branched $C_1$-$C_6$-alkyl group bonded through an oxygen atom. Examples are those listed above for $C_1$-$C_4$-alkyl and further pentyloxy, hexyloxy and their positional isomers. $C_1$-$C_8$-alkoxy is a linear or branched $C_1$-$C_8$-alkyl group bonded through an oxygen atom. Examples are those listed above for $C_1$-$C_6$-alkyl and further heptyloxy, octyloxy, 2-ethylhexyloxy and their positional isomers. $C_1$-$C_{10}$-alkoxy is a linear or branched $C_1$-$C_{10}$-alkyl group bonded through an oxygen atom. Examples are those listed above for $C_1$-$C_8$-alkyl and further nonyloxy, decyloxy and their positional isomers.

$C_1$-$C_4$-alkylthio is a linear or branched $C_1$-$C_4$-alkyl group bonded through a sulfur atom such as methylthio, ethylthio, propylthio, 1-methylethylthio(isopropylthio), butylthio, 1-methylpropylthio(sec-butylthio), 2-methylpropylthio (isobutylthio) and 1,1-dimethylethylthio(tert-butylthio).

$C_5$-$C_6$-cycloalkyl refers to a monocyclic 5- or 6-membered saturated cycloaliphatic radical, such as cyclopentyl and cyclohexyl. $C_3$-$C_6$-cycloalkyl refers to a monocyclic 3- to 6-membered saturated cycloaliphatic radical, such as cyclopropyl, cyclobutyl, cyclopentyl and cyclohexyl. $C_3$-$C_8$-cycloalkyl refers to a monocyclic 3- to 8-membered saturated cycloaliphatic radical. Examples are those listed above for $C_3$-$C_6$-cycloalkyl and further cycloheptyl and cyclooctyl. $C_3$-$C_{10}$-cycloalkyl refers to a monocyclic 3- to 10-membered saturated cycloaliphatic radical. Examples are those listed above for $C_3$-$C_8$-cycloalkyl and further cyclononyl and cyclodecyl.

Cycloalkoxy refers to a monocyclic saturated cycloaliphatic radical as defined above which is bonded through an oxygen atom. Examples include cyclopropyloxy, cyclobutyloxy, cyclopentyloxy, cyclohexyloxy, cycloheptyloxy, cyclooctyloxy, cyclononyloxy and cyclodecyloxy.

$C_6$-$C_{10}$-aryl refers to phenyl or naphthyl. The aryl group is either unsubstituted or carries 1 to 3 substituents. Suitable substituents comprise hydroxy, $NO_2$, $C_1$-$C_4$-alkyl, $C_1$-$C_4$-alkoxy, phenyl, naphthyl, $NR^aR^b$, $COR^a$, $COOR^a$ and $CONR^aR^b$, where each $R^a$ and $R^b$ is independently selected from H and $C_1$-$C_4$-alkyl. Preferably, aryl is unsubstituted.

$C_6$-$C_{10}$-aryloxy is $C_6$-$C_{10}$-aryl as defined above bonded through an oxygen atom. One example is phenoxy.

$C_6$-$C_{10}$-arylthio is $C_6$-$C_{10}$-aryl as defined above bonded through a sulfur atom. One example is phenylthio.

$C_6$-$C_{10}$-aryl-$C_1$-$C_4$-alkyl is $C_6$-$C_{10}$-aryl as defined above bonded through a $C_1$-$C_4$-alkylene linkage. Examples are benzyl and 2-phenylethyl.

$C_6$-$C_{10}$-aryl-$C_1$-$C_4$-alkoxy is $C_6$-$C_{10}$-aryl as defined above bonded through a $C_1$-$C_4$-alkoxy group. One example is benzyloxy.

With respect to the use according to the invention of the compounds of formula I and/or of at least one polymer containing repeating units of the formula II, preference is given to the embodiments described below, in each case on their own or in combination with each other.

In preferred compounds I, each $R^1$ is independently selected from the group consisting of $C_1$-$C_{10}$-alkyl, $C_3$-$C_{10}$-cycloalkyl and $C_6$-$C_{10}$-aryl. More preferably, each $R^1$ is independently selected from $C_1$-$C_6$-alkyl, $C_5$-$C_6$-cycloalkyl and $C_6$-$C_{10}$-aryl. Even more preferably, each $R^1$ is independently selected from $C_1$-$C_4$-alkyl and phenyl. Preferably, $C_6$-$C_{10}$-aryl is unsubstituted, i.e. it is unsubstituted phenyl or unsubstituted naphthyl.

Particularly, in compounds I, all groups $R^1$ have the same meaning.

In one preferred embodiment, m is 0 or 1. Particularly, m is 0.

In one preferred embodiment, n is 2, 3 or 4, which means that the compound of formula I is preferably a 4-, 5- or 6-membered cyclic phosphine. In a particularly preferred embodiment, the compound of formula I is a 5-membered cyclic phosphine, i.e. n=3, or it is a mixture of a 5-membered cyclic phosphine (n=3) with a 4-membered (n=2) and/or a 6-membered (n=4) cyclic phosphine. In the latter case, the 5-membered cyclophosphine is present in an amount of preferably at least 50% by weight, more preferably at least 60% by weight, even more preferably at least 70% by weight and in particular at least 80% by weight, e.g. at least 90% by weight, based on the total weight of the cyclic phosphines.

In a specific embodiment, the compound of formula I is pentaphenyl cyclopentaphosphine (also known as pentaphenylpentaphospholane) (m=0; n=3), or is a mixture of pentaphenyl cyclopentaphosphine with tetraphenyl cyclotetraphosphine and/or hexaphenyl cyclohexaphosphine. In the latter case, pentaphenyl cyclopentaphosphine is present in an amount of preferably at least 50% by weight, more preferably at least 60% by weight, even more preferably at least 70% by weight and in particular at least 80% by weight, e.g. at least 90% by weight, based on the total weight of the cyclic phosphines.

Compounds of formula I can be produced in accordance with known processes for the preparation of cyclic arylphosphines, e.g. as described in U.S. Pat. No. 5,488,079, U.S. Pat. No. 6,369,140, U.S. Pat. No. 6,864,304, DE 19638924, WO 2004/050668, WO 2006/074983, Monatshefte Chemie, 90(2), 1959, 148-156, or J. Org. Chem. 22, 1957, 385-387, the contents of which are hereby fully incorporated by reference. Suitable methods are for example reacting an aryl dihalogenophosphine an of the formula

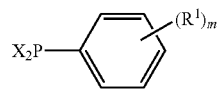

where X is a halogen atom and $R^1$ and m are as defined above, in general the dichloride (X=Cl), with an alkali metal, such as sodium, or an alkaline earth metal, such as magnesium, preferably under reaction conditions which favour the formation of cyclic compounds, e.g. high dilution conditions. The reaction is generally carried out in a suitable solvent. Suitable solvents are those which are generally used in Grignard or other reactions using elemental metals, e.g. acyclic ethers, such as diethyl ether, dipropyl ether, diisopropyl ether, dibutyl ether, diisobutyl ether, methyl-tert-butyl ether, ethyl-tert-butyl ether and the like, cyclic ethers, such as tetrahydrofuran and 1,4-dioxane, and aprotic aromatic solvents, such as benzene, toluene, or the xylenes. Preferred solvents are ethers, in particular cyclic ethers, and specifically tetrahydrofuran. The aryl dihalogenophosphine and the metal are preferably used in a molar ratio of from 0.5:1 to 1:1.5, more preferably from 0.8:1 to 1:1.2, even more preferably from 0.9:1 to 1:1.1 and in particular in approximately equimolar amounts. The reaction temperature is preferably not more than 100° C., e.g. 0 to 100° C. or 20 to 100° C., more preferably not more than 80° C., e.g. 0 to 80° C. or 20 to 80° C., even more preferably not more than 70° C., e.g. 0 to 70° C. or 20 to 70° C. or 40 to 70° C. or 50 to 70° C. After completion of the reaction, the reaction mixture is in general freed from the solvent used and from unreacted starting material, e.g. by filtration and evaporation of the solvent. The obtained product can be used as such or be further purified. Purification can be carried out by known methods, e.g. by washing or digesting the residue with non-solvents or by recrystallization, the latter being preferred. Recrystallization is carried out in a suitable solvent, generally at elevated temperature, e.g. at the boiling point of the mixture. Suitable solvents are aprotic. Examples are aromatic solvents, such as benzene, toluene or the xylenes, cycloaliphatic solvents, such as cyclopentane, cyclohexane or methylcyclohexane, and carbonic acid derivatives, such as ethyl acetate, ethyl propionate or propyl acetate. Preferably, aromatic solvents are used, specifically toluene. At elevated temperatures, a part of the cyclic phosphine might be converted into the polymeric phosphine containing repeating units II. In general, the polymeric phosphine has low solubility, precipitates and thus can easily be separated from the dissolved cyclic phosphine, e.g. by filtration or decanting. The dissolved cyclic phosphine is then precipitated, e.g. by cooling the solution, and isolated.

In preferred repeating units II, each $R^1$ is independently selected from the group consisting of $C_1$-$C_{10}$-alkyl, $C_3$-$C_{10}$-cycloalkyl and $C_6$-$C_{10}$-aryl. More preferably, each $R^1$ is independently selected from $C_1$-$C_6$-alkyl, $C_5$-$C_6$-cycloalkyl and $C_6$-$C_{10}$-aryl. Even more preferably, each $R^1$ is independently selected from $C_1$-$C_4$-alkyl and phenyl. Preferably, $C_6$-$C_{10}$-aryl is unsubstituted, i.e. it is unsubstituted phenyl or unsubstituted naphthyl.

Particularly, in the repeating units II, all groups $R^1$ have the same meaning.

In one preferred embodiment of the repeating units II, m is 0 or 1. Particularly, m is 0.

Preferred polymers contain the repeating units II in an amount of at least 50% by weight, preferably at least 70% by weight, more preferably at least 80% by weight, even more preferably at least 90% by weight, and in particular at least 95% by weight, based on the total weight of the polymer. The maximum upper limit of the amount of repeating units II in the polymer depends on the nature of the groups terminating the polymer, such as halogen or OH, and also on other functional groups which may be present in the polymer, e.g. ether bridges (—O—) or oxidized repeating units II (see below formula II.a).

Preferably, the polymer contains from 3 to 10,000, more preferably from 5 to 1000 and in particular from 5 to 100, e.g. 10 to 100 or 10 to 50, repeating units of formula II.

The number average molecular weight $M_n$ of the polymer is preferably from 300 to 1,000,000 more preferably from 500 to 100,000, in particular from 1000 to 10,000, e.g. from 1000 to 5000.

In one preferred embodiment of the invention, the polymers are of the formula III

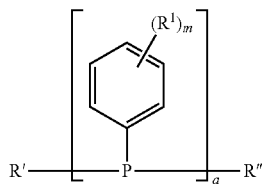

where R' and R", independently of each other, are $C_1$-$C_6$-alkyl, $C_6$-$C_{10}$-aryl, $C_1$-$C_4$-alkoxy, $C_6$-$C_{10}$-aryloxy, $C_1$-$C_4$-alkylthio, $C_6$-$C_{10}$-arylthio or $NR^cR^d$, where $R^c$ and $R^d$, independently of each other, are $C_1$-$C_6$-alkyl or $C_6$-$C_{10}$-aryl, a is an integer from 3 to 10,000 and $R^1$ and m are as defined above. In one embodiment, R' and R" are identical.

Preferably, R' and R", independently of each other, are $C_1$-$C_6$-alkyl, $C_6$-$C_{10}$-aryl, $C_1$-$C_4$-alkoxy or $C_6$-$C_{10}$-aryloxy. More preferably, R' and R", independently of each other, are $C_6$-$C_{10}$-aryl and in particular phenyl which carries m groups $R^1$. Specifically, R' and R" are both phenyl.

a is preferably an integer from 3 to 1000, e.g. from 5 to 1000, more preferably from 3 to 100, e.g. from 5 to 100, and in particular from 3 to 50, e.g. from 5 to 50 or from 10 to 50.

Polymers containing repeating units II can be produced in accordance with known processes for the preparation of polymeric arylphosphines, e.g. by reacting an aryl dihalogenophosphine (aryl being phenyl substituted by m groups $R^1$), in general the dichloride, with an alkali metal, such as sodium, or an alkaline earth metal, such as magnesium, preferably under conditions which favour the production of polymers. For instance, polymeric phosphines overbalance cyclic phosphines I when the above-described synthesis of cyclic phosphines is carried out at higher temperatures, e.g. at >100° C.

As already indicated above, the polymers can be formed as by-products in the synthesis and in particular during the purification of cyclic phosphines I and can be separated from the latter by known methods. For instance, the polymers containing repeating units II can be obtained by reacting an aryl dihalogenophosphine (aryl being phenyl substituted by m groups $R^1$), in general the dichloride, with an alkali metal, such as sodium, or an alkaline earth metal, such as magnesium, by the method described above for the cyclic phosphines I, removing the solvent used and unreacted starting materials, and recrystallizing the obtained product in a suitable solvent at elevated temperature, e.g. at the boiling point of the mixture. Suitable solvents are aprotic. Examples are aromatic solvents, such as benzene, toluene or the xylenes, cycloaliphatic solvents, such as cyclopentane, cyclohexane or methylcyclohexane, and carbonic acid derivatives, such as ethyl acetate, ethyl propionate or propyl acetate. Preferably, aromatic solvents are used, specifically toluene. During heating, polymeric material is formed, which precipitates. The precipitated polymer can then be separated from the cyclic polymer (which is present in solution) by standard methods, e.g. by filtration or decanting.

Thus, the polymer containing repeating units II to be is preferably one obtainable by the above-described method.

The polymer/oligomer may also contain oxidized phosphorous atoms and thus repeating units of the formula II.a

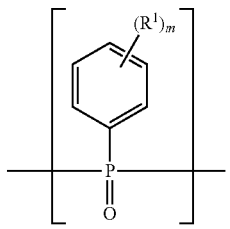

where $R^1$ and m are as defined above.

Preferably, the polymer/oligomer contains not more than 50% by weight, more preferably not more than 30% by weight, even more preferably not more than 20% by weight, and in particular not more than 10% by weight, e.g. not more than 5% by weight of repeating units II.a, based on the total weight of the polymer.

In one preferred embodiment, a mixture of at least one cyclic phosphine I and at least one polymer/oligomer containing repeating units II is used.

In another preferred embodiment, use is made of a composition obtainable by reacting an aryl dihalogenophosphine of the formula

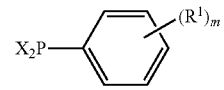

where X is a halogen atom and $R^1$ and m are as defined above, with a suitable metal, e.g. an alkali metal, such as sodium, or an alkaline earth metal, such as magnesium, preferably under reaction conditions described above for the synthesis of cyclic phosphines. After completion of the reaction, the reaction mixture is in general freed from the solvent used and from unreacted starting material, e.g. by filtration and evaporation of the solvent. The obtained residue can be used as such or be further purified. Purification can be carried out by known methods, e.g. by washing or digesting the residue with non-solvents or by recrystallization.

In another preferred embodiment, at least one cyclic phosphine I is used as flame retardant.

In another preferred embodiment, at least one polymer/oligomer containing repeating units II is used as flame retardant.

In one preferred embodiment, the present invention relates to the use of compounds of formula I and/or of at least one polymer containing repeating units of the formula II as flame retardants in organic materials. Organic materials to be protected are materials at least partly organic in nature (i.e. mainly based on C atoms), e.g. polymeric materials, performance fluids, textiles, wood products (particularly timber/lumber) or paper products (e.g. paper boards, wallpaper). The definitions of the above materials partly overlap (e.g. wood and paper are based on cellulose which itself is a natural polymer) and especially the term "polymeric material" is to be understood in its broadest sense.

In a more preferred embodiment, the present invention relates to the use of compounds of formula I and/or of at least one polymer containing repeating units of the formula II as flame retardants in polymeric materials or in performance fluid. In particular, the present invention relates to the use of compounds of formula I and/or of at least one polymer containing repeating units of the formula II as flame retardants in polymeric materials.

In the terms of the present invention, performance fluid broadly refers to an organic liquid which is intended for a specific use. Performance fluids can be negatively defined as organic liquids which are not intended for mass-market use, such as combustibles or general solvents. Examples for performance liquids are hydraulic fluids, brake fluids, lubricants and fluids for electronic applications (e.g. to be used for cleaning or heat transfer).

In the terms of the present invention, "polymeric material" refers to materials comprising natural or synthetic polymers as such or in processed form, e.g. in the form of plastics (in shaped, semifinished or unshaped form), polymer composites or polymer blends.

The term "plastics" is not synonymous with the term "polymer", but refers to the product obtained from polymers or prepolymers after physical compounding and/or chemical hardening (curing) and optionally shaping.

"Compounding" is the mixing of polymers and additives.

"Composite" denotes a complex material in which two or more distinct substances combine to produce properties which are not present in the single components. In polymer composites, at least one component is of polymeric nature. The term encompasses both heterogeneous mixtures of polymers with another material (such as minerals, fibers, other plastics, elastomers), but also homogeneous mixtures (single phase) of two or more polymers, which is also called homogeneous polymer blend. Examples for composites are so-called prepregs (preimpregnated fibers), a semifinished fiber-reinforced uncured thermosetting matrix (i.e. a fiber mat soaked with uncured thermoset material). Further examples are composites generated by filament winding (wound filaments saturated with uncured material, e.g. polyesters), polymer concrete (composed of polymer (e.g. polyester or polymethylmethacrylate), aggregate (e.g. sand, ground limestone) and optionally additives (e.g. dyes)), laminates and composition boards (e.g. particle boards, fiber boards, hardboards generally containing wood products (flakes, fibers) as fillers).

Mixtures of polymers with other polymers are called polymer blends. Such blends may be composed of two thermoplastics (plastic blends), two elastomers (rubber blends), a plastic filled with an elastomer as the dispersed phase (rubber-modified plastics), an elastomer with a plastic as the dispersed phase (polymer-filled elastomer), or a plastic filled with a polymer melt or a low molar mass liquid (plasticized polymers). The blend may be homogeneous or heterogeneous.

In one preferred embodiment of the invention, the polymeric material to be flame retarded is selected from thermoplastic polymers. Thermoplastics are plastics which yield solid materials upon cooling of a polymer melt and soften upon heating, the shaping of a thermoplastic thus being a reversible process. They are normally composed of relatively high molar mass molecules and form the major part of plastics. Examples are polyolefins, vinyl polymers, polyamides, polyester, polyacetates, polycarbonates and some polyurethanes and ionomers. The term "thermoplastic" is used both for the polymer per se as well as for the processed form.

In an alternatively preferred embodiment, the polymeric material to be flame retarded is selected from thermoset polymers. Thermosets harden through chemical cross-linking reactions (curing) of polymer molecules. When heated, they do not soften, but decompose chemically. The formation (shaping) of a thermoset is thus irreversible. They are normally generated from relatively low molar mass polymers (oligomers or prepolymers) which become interconnected upon curing (cross-linking). The term "thermoset" is used both for the prepolymer as well as for the cured plastic produced from the prepolymer.

In an alternatively preferred embodiment, the polymeric material to be flame retarded is selected from elastomeric polymers. Elastomers are long polymer chains above their glass transition temperature. They are usually lightly crosslinked and are easily deformed. Elastomers can be elongated repeatedly at room temperature to at least twice their length. When no longer stretched, they return to (approximately) their original length. Most prominent examples are rubbers (natural and synthetic).

In the following, suitable polymers are listed which themselves or the processed form of which are suitable to be flame retarded.

(a) In one preferred embodiment the polymer is a halogenated polymer. The halogenated polymers include polychloroprene, chlorinated and fluorinated rubbers, chlorinated and brominated copolymer of isobutylene-isoprene (halogen rubber), chlorinated and sulfochlorinated polyethylene, copolymers of ethylene and chlorinated ethylene and chlorinated ethylene, especially polymers of halogen-comprising vinyl compounds, e.g., polyvinyl chloride (PVC), polyvinylidene chloride (PVDC), polyvinyl fluoride, polyvinylidene fluoride, and copolymers thereof, such as vinyl chloride/vinylidene chloride, vinyl chloride/vinyl acetate or vinylidene chloride/vinyl acetate copolymers. Depending on the plasticizer content, different polyvinyl chloride products can be obtained: a plasticizer content of 0-12% yields rigid PVC, more than 12% flexible PVC, and a very high plasticizer content PVC pastes. Examples of typical plasticizers include phthalates, epoxides, and adipic esters.

Polyvinyl chloride is prepared by free-radical polymerization of vinyl chloride in bulk, suspension, microsuspension, and emulsion polymerization. The polymerization is frequently initiated by peroxides. PVC is employed diversely, as for example synthetic foam leather, insulating wall coverings, household articles, footwear soles, furniture profiles, floor coverings or pipes.

Polyvinylidene chloride is prepared by free-radical polymerization of vinylidene chloride. Vinylidene chloride can also be copolymerized with (meth)acrylates, vinyl chloride or acrylonitrile. Polyvinylidene chloride and also the vinylidene copolymers are processed for example to form films, but also to form profiles, pipes, and fibers. One important application concerns multilayer films; the good barrier properties of polyvinylidene chloride are also used for coatings.

(b) In a further preferred embodiment, the polymer is selected from homopolymers and copolymers of cyclic ethers, such as polyalkylene glycols, e.g., polyethylene oxide, polypropylene oxide or copolymers thereof with bisglycidyl ethers. Polyalkylene glycols result from polyaddition of a cyclic ether such as ethylene oxide, propylene oxide or tetrahydrofuran, for example, with an OH compound as starter molecule, such as water. Starter molecules for the polyaddition may also be dihydric or polyhydric alcohols. Low molecular mass polyalkylene glycols are used as synthetic lubricants. Additionally, polyalkylene glycols are used as solubilizers for surfactant combinations, as binders in soaps, as ingredients in inks for writing and stamping, and as plasticizers and release agents.

(c) In a further preferred embodiment, the polymer is selected from polyacetals, copolymers of polyacetals with cyclic ethers, and polyacetals modified with thermoplastic polyurethanes, acrylates or methyl acrylate/butadiene/styrene copolymers. Polyacetals are produced by the polymerization of aldehydes or of cyclic acetals. One industrially significant polyacetal is polyoxymethylene (POM), which is obtainable through cationic or anionic polymerization of formaldehyde or trioxane, respectively. Modified POM is obtained, for example, by copolymerization with cyclic ethers such as ethylene oxide or 1,3-dioxolane. Combination of POM with thermoplastic polyurethane elastomers produces POM-based polymer blends. Unreinforced POM is notable for very high stiffness, strength, and toughness. POM is used preferably for constructing household appliances and for constructing apparatus, vehicles, and machinery, and in sanitary and installation engineering.

(d) In a further preferred embodiment, the polymer is selected from polyaryl ethers, polyaryl sulfides, and mixtures of polyaryl ethers with styrene polymers and polyamides. An example of polyaryl ethers are polyphenylene oxides, whose main chain are constructed from phenylene units which are linked via oxygen atoms and substituted if appropriate by alkyl groups. One industrially significant polyphenylene oxide is poly-2,6-dimethylphenyl ether. An example of polyaryl sulfides are polyphenylene sulfides, which are obtainable by polycondensation of 1,4-dichlorobenzene with sodium sulfide. They are notable for high strength, stiffness, and hardness. They are a suitable substitute for metals in the construction of pump housings and for other elements of mechanical engineering and apparatus construction. Further fields of use for polyphenylene sulfides are electrical engineering and electronics.

(e) In a further preferred embodiment, the polymer is selected from polyurethanes. Suitable polyisocyanate polyaddition products (polyurethanes) are, for example, cellular polyurethanes, examples being rigid or flexible polyurethane foams, compact polyurethanes, thermoplastic polyurethanes (TPUs), thermoset or elastic polyurethanes or polyisocyanurates. These polymers are common knowledge and their preparation has been widely described. They are typically prepared by reacting difunctional and higher polyfunctional isocyanates or corresponding isocyanate analogs with isocyanate-reactive compounds. The preparation takes place by typical methods, such as by the one-shot method or by the prepolymer method, in molds, in a reaction extruder or else on a belt unit, for example. One specific preparation process is the reaction injection molding (RIM) process, which is used preferably for preparing polyurethanes having a foamed or compact core and a predominantly compact, nonporous surface. Compound (I) and its derivatives is suitable advantageously for all of these processes.

Polyurethanes are generally synthesized from at least one polyisocyanate and at least one compound having at least two groups per molecule that are reactive toward isocyanate groups. Suitable polyisocyanates possess preferably 2 to 5 NCO groups. The groups that are reactive toward isocyanate groups are preferably selected from hydroxyl, mercapto, primary and secondary amino groups. Included here are preferably dihydric or higher polyhydric polyols.

Suitable polyisocyanates are aliphatic, cycloaliphatic, araliphatic and aromatic isocyanates. Suitable aromatic diisocyanates are, for example, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate and/or phenylene diisocyanate. Aliphatic and cycloaliphatic diisocyanates comprise, for example, tri-, tetra-, penta-, hexa-, hepta- and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethyl-cyclohexane (isophorone diisocyanate, IPDI), 1,4- and/or 1,3-bis(isocyanatomethyl)-cyclohexane (HXDI), cyclohexane 1,4-diisocyanate, 1-methyl-2,4- and/or 2,6-cyclo-hexanediisocyanato and/or dicyclohexylmethane 4,4'-, 2,4'- and/or 2,2'-diisocyanate. The preferred diisocyanates include hexamethylene diisocyanate (HMDI) and isophorone diisocyanate. Examples of higher polyfunctional isocyanates are triisocyanates, such as triphenylmethane 4,4',4''-triisocyanate, and also the cyanurates of the aforementioned diisocyanates, and also the oligomers obtainable by partial reaction of diisocyanates with water, such as the biurets of the aforementioned diisocyanates, and, furthermore, oligomers obtainable by targeted reaction of semiblocked diisocyanates with polyols having on average more than 2 and preferably 3 or more hydroxyl groups.

Polyol components used in this context, for rigid polyurethane foams, which if appropriate may have isocyanurate structures, are high-functionality polyols, especially polyether polyols based on high-functionality alcohols, sugar alcohols and/or saccharides as starter molecules. For flexible polyisocyanate polyaddition products, such as flexible polyurethane foams or RIM materials, preferred polyols are 2- and/or 3-functional polyether polyols based on glycerol and/or trimethylolpropane and/or glycols as starter molecules, and 2- and/or 3-functional polyether polyols based on glycerol and/or trimethylolpropane and/or glycols as alcohols for esterification. Thermoplastic polyurethanes are based typically on predominantly difunctional polyester polyalcohols and/or polyether polyalcohols which preferably have an average functionality of 1.8 to 2.5, more preferably 1.9 to 2.1.

The preparation of the polyether polyols in this context takes place in accordance with known technologies. Examples of suitable alkylene oxides for preparing the polyols include propylene 1,3-oxide, butylene 1,2- and/or 2,3-oxide, styrene oxide, and, preferably, ethylene oxide and propylene 1,2-oxide. The alkylene oxides can be used individually, alternately in succession, or as mixtures. It is preferred to use alkylene oxides which lead to primary hydroxyl groups in the polyol. Polyols used with particular preference are those which to end the alkoxylation have been alkoxylated with ethylene oxide and so have primary hydroxyl groups. Further suitable polyetherols are polytetrahydrofurans and polyoxymethylenes. The polyether polyols possess a functionality of preferably 2 to 6 and in particular 2 to 4 and molecular weights of 200 to 10 000, preferably 200 to 8000.

Suitable polyester polyols can be prepared for example from organic dicarboxylic acids having 2 to 12 carbon atoms, preferably aliphatic dicarboxylic acids having 4 to 6 carbon atoms, and from polyhydric alcohols, preferably diols, having 2 to 12 carbon atoms, preferably 2 to 6 carbon atoms. The polyester polyols preferably possess a functionality of 2 to 4, in particular 2 to 3, and a molecular weight of 480 to 3000, preferably 600 to 2000, and in particular 600 to 1500.

The polyol component may further comprise diols or higher polyhydric alcohols. Suitable diols are glycols having preferably 2 to 25 carbon atoms. These include 1,2-ethanediol, 1,2-propanediol, 1,3-propanediol, 1,4-butanediol, 1,5-pentanediol, 1,6-hexanediol, 1,10-decanediol, diethylene glycol, 2,2,4-trimethylpentane-1,5-diol, 2,2-dimethylpropane-1,3-diol, 1,4-dimethylolcyclohexane, 1,6-dimethylolcyclohexane, 2,2-bis(4-hydroxyphenyl)propane (bisphenol A), 2,2-bis(4-hydroxyphenyl)butane (bisphenol B) or 1,1-bis(4-hydroxyphenyl)-3,3,5-trimethylcyclohexane (bisphenol C). Suitable higher polyhydric alcohols are, for example, trihydric (triols), tetrahydric (tetrols) and/or pentahydric alcohols (pentols). They generally have 3 to 25, preferably 3 to 18 carbon atoms. They include glycerol, trimethylolethane, trimethylolpropane, erythritol, pentaerythritol, sorbitol, and the alkoxylates thereof.

To modify the mechanical properties, the hardness for example, it may nevertheless prove advantageous to add chain extenders, crosslinking agents, stoppers or else, if appropriate, mixtures of these. The chain extenders and/or crosslinking agents have for example a molecular weight of 40 to 300. Suitable examples include aliphatic, cycloaliphatic and/or aralipathic diols having 2 to 14, preferably 2 to 10 carbon atoms, such as ethylene glycol, 1,3-propanediol, 1,2-propanediol, 1,10-decanediol-, 1,2-, 1,3-, 1,4-dihydroxycyclohexane, diethylene glycol, dipropylene glycol, and, preferably, ethylene glycol, 1,4-butanediol, 1,6-hexanediol, and bis(2-hydroxyethyl)hydroquinone, triols, such as 1,2,4-, 1,3,5-trihydroxycyclohexane, glycerol, trimethylolpropane, triethanolamine, and low molecular mass, hydroxyl-containing polyalkylene oxides based on ethylene oxide and/or propylene 1,2-oxide and the aforementioned diols and/or triols as starter molecules. Suitable stoppers comprise, for example, monofunctional alcohols or secondary amines.

Polyurethanes are mostly processed to foams.

(f) In a further preferred embodiment, the polymer is selected from polyureas, polyimides, polyamideimides, polyetherimides, polyesterimides, polyhydantoins, and polybenzimidazoles. Polyureas come about as is known through polyaddition of diamines and diisocyanates. Polyimides, whose key structural element is the imide group in the main chain, come about through reaction of aromatic tetracarboxylic dianhydrides with aliphatic or aromatic diamines. Polyimides are used as, among other things, adhesives in composites, and also for coatings, thin films, as insulating material in microelectronics, for example, for high-modulus fibers, for semipermeable membranes, and as liquid-crystalline polymers.

(g) In a further preferred embodiment, the polymer is selected from polyesters, preferably at least one linear polyester. Suitable polyesters and copolyesters are described in EP-A-0678376, EP-A-0 595 413, and U.S. Pat. No. 6,096,854, hereby incorporated by reference. Polyesters, as is known, are condensation products of one or more polyols and one or more polycarboxylic acids or the corresponding lactones. In linear polyesters, the polyol is a diol and the polycarboxylic acid a dicarboxylic acid. The diol component may be selected from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, and 1,3-cyclohexanedimethanol. Also suitable are diols whose alkylene chain is interrupted one or more times by nonadjacent oxygen atoms. These include diethylene glycol, triethylene glycol, dipropylene glycol, tripropylene glycol, and the like. In general the diol comprises 2 to 18 carbon atoms, preferably 2 to 8 carbon atoms. Cycloaliphatic diols can be used in the form of their cis or trans isomers or as an isomer mixture. The acid component may be an aliphatic, alicyclic or aromatic dicarboxylic acid. The acid component of linear polyesters is generally selected from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid, and mixtures thereof. It will be appreciated that the functional derivatives of the acid component can also be employed, such as esters, examples being the methyl esters, or anhydrides or halides, preferably chlorides. Preferred polyesters are polyalkylene terephthalates, and polyalkylene naphthalates, which are obtainable by condensing terephthalic acid or naphthalenedicarboxylic acid, respectively, with an aliphatic diol.

Preferred polyalkylene terephthalates are polyethylene terephthalates (PET), which are obtained by condensing terephthalic acid with diethylene glycol. PET is also obtainable by transesterifying dimethyl terephthalate with ethylene glycol, with elimination of methanol, to form bis(2-hydroxyethyl)terephthalate, and subjecting the product to polycondensation, releasing ethylene glycol. Further preferred polyesters are polybutylene terephthalates (PBT), which are obtainable by condensing terephthalic acid with 1,4-butanediol, polyalkylene naphthalates (PAN) such as polyethylene 2,6-naphthalates (PEN), poly-1,4-cyclohexanedimethylene terephthalates (PCT), and also copolyesters of polyethylene terephthalate with cyclohexanedimethanol (PDCT), copolyesters of polybutylene terephthalate with cyclohexanedimethanol. Also preferred are copolymers, transesterification products, and physical mixtures (blends) of the aforementioned polyalkylene terephthalates. Particularly suitable polymers are selected from polycondensates and copolycondensates of terephthalic acid, such as poly- or copolyethylene terephthalate (PET or CoPET or PETG), poly(ethylene 2,6-naphthalate)s (PEN) or PEN/PET copolymers and PEN/PET blends. Said copolymers and blends, depending on their preparation process, may also comprise fractions of transesterification products.

PET and PBT are widely employed in the production of fibers and also exhibit high resistance as thermoplastic materials for industrial parts such as bearings, cogs, cam disks, rollers, switch housings, plugs, handles, operating buttons. PET is used to a high degree as a material for drinks bottles.

(h) In a further preferred embodiment, the polymer is selected from polycarbonates, polyestercarbonates, and mixtures thereof. Polycarbonates come about for example through condensation of phosgene or carbonic esters such as diphenyl carbonate or dimethyl carbonate with dihydroxy compounds. Suitable dihydroxy compounds are aliphatic or aromatic dihydroxy compounds. As aromatic dihydroxy compounds mention may be made for example of bisphenols such as 2,2-bis(4-hydroxyphenyl)propane (bisphenol A), tetraalkylbisphenol A, 4,4-(meta-phenylenediisopropyl)diphenol (bisphenol M), 4,4-(para-phenylenediisopropyl)diphenol, 1,1-bis(4-hydroxyphenyl)-3,3,5-trimethylcyclohexane (BP-TMC), 2,2-bis(4-hydroxyphenyl)-2-phenylethane, 1,1-bis(4-hydroxyphenyl)cyclohexane (bisphenol Z), and also, if appropriate, mixtures thereof. The polycarbonates may be branched by using small amounts of branching agents. Suitable branching agents include phloroglucinol, 4,6-dimethyl-2,4,6-tri-(4-hydroxyphenyl)hept-2-ene, 4,6-dimethyl-2,4,6-tri(4-hydroxyphenyl)heptane; 1,3,5-tri(4-hydroxyphenyl)benzene; 1,1,1-tri(4-hydroxyphenyl)heptane; 1,3,5-tri(4-hydroxyphenyl)benzene; 1,1,1-tri(4-hydroxyphenyl)ethane; tri(4-hydroxyphenyl)phenylmethane, 2,2-bis[4,4-bis(4-hydroxyphenyl)cyclohexyl]-propane; 2,4-bis(4-hydroxyphenylisopropyl)phenol; 2,6-bis(2-hydroxy-5'-methylbenzyl)-4-methylphenol; 2-(4-hydroxyphenyl)-2-(2,4-dihydroxyphenyl)propane; hexa(4-(4-hydroxyphenylisopropyl)phenyl)ortho-terephthalic esters; tetra(4-hydroxyphenyl)methane; tetra(4-(4-hydroxyphenylisopropyl)phenoxy)methane; α,α',α"-tris(4-hydroxyphenyl)-1,3,5-thisopropylbenzene; 2,4-dihydroxybenzoic acid; trimesic acid; cyanuric chloride; 3,3-bis(3-methyl-4-hydroxyphenyl)-2-oxo-2,3-dihydroindole, 1,4-bis(4',4"-dihydroxytriphenyl)methypenzene, and, in particular, 1,1,1-tri(4-hydroxyphenyl)ethane and bis(3-methyl-4-hydroxyphenyl)-2-oxo-2,3-dihydroindole.

Examples of compounds suitable for chain termination include phenols such as phenol, alkylphenols such as cresol and 4-tert-butylphenol, chlorophenol, bromophenol, cumylphenol, or mixtures thereof. The fraction of chain terminators is generally 1 to 20 mol %, per mole of dihydroxy compound.

(i) In a further preferred embodiment, the polymer is selected from polysulfones, polyethersulfones, polyetherketones, and mixtures thereof. Polyetherketones are used for example in the electrical industry and in automotive engineering.

(j) In a further preferred embodiment, the polymer is selected from synthetic resins. The synthetic resins include crosslinked polymers derived from aldehydes on the one hand and from phenols, ureas, and melamines on the other, such as phenol/formaldehyde resins, urea/formaldehyde resins, and melamine/formaldehyde resins. The synthetic resins likewise include drying and nondrying alkyd resins and unsaturated polyester resins, derived from copolyesters of saturated and unsaturated dicarboxylic acids with polyhydric alcohols and vinyl compounds as crosslinking agents and also halogen-comprising modifications thereof of low flammability. The synthetic resins further include crosslinkable acrylic resins derived from substituted acrylates, such as epoxy acrylates, urethane acrylates or polyester acrylates. The synthetic resins additionally include alkyd resins, polyester resins, and acrylate resins crosslinked with melamine resins, urea resins, isocyanates, isocyanurates, or polyisocyanates The synthetic resins also include hydrocarbon resins, which typically have a molecular weight below 2000. The hydrocarbon resins can be classified in three groups: petroleum resins, terpene resins, and coal tar resins. The hydrocarbon resins also include, for the purposes of this invention, the hydrogenated modifications thereof and polyalkylenes.

(k) In a further preferred embodiment, the polymer is selected from natural polymers, such as cellulose, rubber, gelatin, and chemically modified derivatives thereof, examples being cellulose acetates, cellulose propionates, and cellulose butyrates, or the cellulose ethers, such as methylcellulose; and also rosin and its derivatives.

Cellulose is used principally as a blend with PET fibers in the clothing sector; and additionally as artificial silk, lining materials, curtain materials, tire cord, cotton wool, dressing materials, and sanitary articles. Cellulose esters are processed, for example, into screwdriver handles, spectacle frames, brushes, combs, ballpoint pens, industrial components such as vehicle steering wheels, lamp and instrument covers, typewriter keys, electrical insulating films, films for photographic use, and into light-resistant and heat-resistant thermoplastic binders for coating materials. Cellulose ethers serve as binders for transparent coating material for textiles, paper, films, and metals. Natural rubber (1,4-cis-polyisoprene) is indispensable for many applications, including radial tires for example.

(I) In a further preferred embodiment, the polymer is selected from polyolefins and mixtures thereof.

For the purposes of the present invention the term "polyolefin" comprises all polymers composed of olefins without further functionality, such as polyethylene, polypropylene, polybut-1-ene or polyisobutylene, poly-4-methylpent-1-ene, polyisoprene, polybutadiene, polymers of cycloolefins, such as of cyclopentene or norbornene, and also copolymers of monoolefins or diolefins, such as ethylene-propylene copolymers or ethylene-butadiene-copolymers.

Ethylene Polymers:

Suitable polyethylene (PE) homopolymers, classed according to density, are for example:

PE-ULD (ULD=ultralow density), PE-VLD (VLD=very low density); copolymers and terpolymers of ethylene with up to 10% octene, 4-methylpent-1-ene, and occasionally propylene; density between 0.91 and 0.88 g/cm$^3$; barely crystalline, transparent PE-LD (LD=low density), obtainable, for example, by the high-pressure process (ICI) at 1000 to 3000 bar and 150 to 300° C. with oxygen or peroxides as catalysts in autoclaves or tube reactors. Highly branched with branches of different length, crystallinity 40 to 50%, density 0.915 to 0.935 g/cm$^3$, average molar mass up to 600 000 g/mol.

PE-LLD (LLD=linear low density), obtainable with metal complex catalysts in the low-pressure process from the gas phase, from a solution (e.g., benzine), in a suspension or with a modified high-pressure process. Slight branching with side chains which are themselves unbranched, molar masses higher than for PE-LD.

PE-MD (MD=middle density); the density between 0.93 and 0.94 g/cm$^3$; can be prepared by mixing PE-LD and PE-HD or directly as a copolymeric PE-LLD.

PE-HD (HD=high density), obtainable by the medium-pressure (Phillips) and low-pressure (Ziegler) processes. By Phillips at 30 to 40 bar, 85 to 180° C., chromium oxide catalyst, molar masses about 50 000 g/mol. By Ziegler at 1 to 50 bar, 20 to 150° C., titanium halides, titanium esters or aluminum alkyls as catalysts, molar mass about 200 000 to 400 000 g/mol. Execution in suspension, solution, gas phase or bulk. Very slight branching, crystallinity 60% to 80%, density 0.942 to 0.965 g/cm$^3$.

PE-HD-HMW (HMW=high molecular weight), obtainable by Ziegler, Phillips or gas-phase method. High density and high molar mass.

PE-HD-UHMW (UHMW=ultra high molecular weight) obtainable with modified Ziegler catalyst, molar mass 3 000 000 to 6 000 000 g/mol.

Particularly suitable polyethylene is that prepared in a gas-phase fluid-bed process using (typically supported) catalysts, e.g., Lupolen® (Basell, Netherlands).

Particular preference is given to polyethylene prepared using metallocene catalysts. Such polyethylene is available commercially as, for example, Luflexen® (Basell, Netherlands).

Suitable ethylene copolymers are all commercial ethylene copolymers, examples being Luflexen® grades (Basell; Netherlands), Nordel® and Engage® (DuPont-Dow, USA). Examples of suitable comonomers include α-olefins having 3 to 10 carbon atoms, especially propylene, but-1-ene, hex-1-ene, and oct-1-ene, and also alkyl acrylates and methacrylates having 1 to 20 carbon atoms in the alkyl radical, especially butyl acrylate. Further suitable comonomers are dienes such as butadiene, isoprene, and octadiene, for example. Further suitable comonomers are cycloolefins, such as cyclopentene, norbornene, and dicyclopentadiene.

The ethylene copolymers are typically random copolymers or block or impact copolymers. Suitable block or impact copolymers of ethylene and comonomers are, for example, polymers for which in the first stage a homopolymer of the comonomer or a random copolymer of the comonomer is prepared, containing up to 15% by weight of ethylene, and then in the second stage a comonomer-ethylene copolymer with ethylene contents of 15% to 80% by weight is polymerized on. Ordinarily, sufficient of the comonomer-ethylene copolymer is polymerized on for the copolymer produced in the second stage to have a fraction of 3% to 60% by weight in the end product.

The polymerization for preparing the ethylene-comonomer copolymers can take place by means of a Ziegler-Natta catalyst system. It is, however, also possible to use catalyst systems based on metallocene compounds or based on polymerization-active metal complexes.

HDPE is used to produce principally toys, household articles, small industrial parts, and beer crates. Certain varieties of HDPE find use in disposable and mass-produced articles of everyday living. The field of use of LDPE extends from films through paper coating and on to thick- and thin-walled moldings. LLDPE exhibits advantages over LDPE in terms of the mechanical properties and in terms of resistance to stress cracking. LLDPE is employed especially for pipes and films.

Propylene Polymers:

Polypropylene should be understood below to refer both to homopolymers and to copolymers of propylene. Copolymers of propylene comprise minor amounts of monomers copolymerizable with propylene, examples being $C_2$-$C_8$-alk-1-enes such as ethylene, but-1-ene, pent-1-ene or hex-1-ene, among others. It is also possible to use two or more different comonomers.

Suitable polypropylenes include homopolymers of propylene or copolymers of propylene with up to 50% by weight of copolymerized other alk-1-enes having up to 8 C atoms. The copolymers of propylene are in this case random copolymers or block or impact copolymers. Where the copolymers of propylene are of random construction they generally comprise up to 15% by weight, preferably up to 6% by weight, of other alk-1-enes having up to 8 C atoms, especially ethylene, but-1-ene or a mixture of ethylene and but-1-ene.

Suitable block or impact copolymers of propylene are, for example, polymers for which in the first stage a propylene homopolymer or a random copolymer of propylene with up to 15% by weight, preferably up to 6% by weight, of other alk-1-enes having up to 8 C atoms is prepared and then in the second stage a propylene-ethylene copolymer having ethylene contents of 15% to 80% by weight is polymerized on, the propylene-ethylene copolymer possibly further comprising additional $C_4$-$C_8$-alk-1-enes. Ordinarily, sufficient of the propylene-ethylene copolymer is polymerized on that the copolymer produced in the second stage has a fraction of 3% to 60% by weight in the end product.

The polymerization for preparing polypropylene can take place by means of a Ziegler-Natta catalyst system. In that case use is made in particular of catalyst systems which in addition to a titanium-containing solid component a) also contain cocatalysts in the form of organic aluminum compounds b) and electron donor compounds c).

It is also possible, however, to use catalyst systems based on metallocene compounds or based on polymerization-active metal complexes.

The preparation of the polypropylenes is carried out typically by polymerization in at least one reaction zone or, frequently, in two or more reaction zones connected in series (a reactor cascade), in the gas phase, in a suspension or in a liquid phase (bulk phase). The reactors used can be the typical reactors employed for polymerizing $C_2$-$C_8$-alk-1-enes. Suitable reactors include continuous stirred tanks, loop reactors, powder bed reactors or fluid bed reactors.

The polymerization for preparing the polypropylenes used is performed under typical reaction conditions at temperatures from 40 to 120° C., in particular from 50 to 100° C., and pressures from 10 to 100 bar, in particular from 20 to 50 bar.

Suitable polypropylenes generally have a melt flow rate (MFR), to ISO 1133, of 0.1 to 200 g/10 min, in particular from 0.2 to 100 g/10 min, at 230° C. under a weight of 2.16 kg.

In a further embodiment of the invention the plastic comprises at least one polyolefin. Preferred polyolefins comprise at least one monomer in copolymerized form, selected from ethylene, propylene, but-1-ene, isobutylene, 4-methyl-1-pentene, butadiene, isoprene, and mixtures thereof. Suitability is possessed by homopolymers, copolymers of the stated olefin monomers, and copolymers of at least one of the stated olefins as principal monomer, with other monomers (such as vinylaromatics, for example) as comonomers.

Preferred polyolefins are low-density polyethylene homopolymers (PE-LD) and polypropylene homopolymers and polypropylene copolymers. Preferred polypropylenes are, for example, biaxially oriented polypropylene (BOPP) and crystallized polypropylene. Preferred mixtures of the aforementioned polyolefins are, for example, mixtures of polypropylene with polyisobutylene, polypropylene with polyethylene (e.g., PP/HDPE, PP/LDPE), and mixtures of different kinds of polyethylene (e.g., LDPE/HDPE).

(m) In a further preferred embodiment, the polymer is selected from copolymers of mono-olefins or diolefins with vinyl monomers and mixtures thereof. These include ethylene/propylene copolymers, linear low-density polyethylene (LLDPE) and mixtures thereof with low-density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers, and copolymers thereof with carbon monoxide, or ethylene/acrylic acid copolymers and their salts (ionomers) and also terpolymers of ethylene with propylene and a diene, such as hexadiene, dicyclopentadiene or ethylidene-norbornene; and mixtures of such copolymers with one another and with polymers mentioned above in 1), examples being polypropylene/ethylene-propylene copolymers, LDPE/ethylene-vinyl acetate copolymers, (EVA), LDPE/ethylene-acrylic acid copolymers, (EAA), LLDPE/EVA, LLDPE/EAA, and alternating or random polyalkylene carbon monoxide copolymers, and mixtures thereof with other polymers, polyamides for example.

(n) In a further preferred embodiment, the polymer is selected from polymers derived from unsaturated alcohols and amines or from their acyl derivatives or acetals, such as polyvinyl acetate (PVAC) and polyvinyl alcohol (PVAL). The reaction of polyvinyl alcohol with an aldehyde produces polyvinylacetals; for example, on reaction with formaldehyde, polyvinylformals (PVFM) or, with butyraldehyde, the polyvinylbutyrals (PVB). On account of their low glass transition temperature, polyvinyl compounds are not thermoplastic materials but instead are polymer resins. They are used as coating materials, such as for carpet-backing coatings, cheese coatings, paper coating slips, paint and pigment binders, paint base material, sizes, adhesives, protective colloids, chewing gum base, concrete additive, films for producing laminated glass for automotive windshields, and for many other purposes.

(o) In a further preferred embodiment, the polymer is selected from polyamides (abbreviated code PA) or copolyamides which as key structural elements have amide groups in the main polymer chain. Polyamides can be prepared, for example, by polycondensation from diamines and dicarboxylic acids or their derivatives. Examples of suitable diamines include alkyldiamines such as $C_2$-$C_{20}$-alkyldiamines, e.g., hexamethylenediamine, or aromatic diamines, such as $C_6$ to $C_{20}$ aromatic diamines, e.g., m-, o- or p-phenylenediamine or m-xylenediamine. Suitable dicarboxylic acids comprise aliphatic dicarboxylic acids or their derivatives, chlorides for example, such as $C_2$ to $C_{20}$ aliphatic dicarboxylic acids, e.g., sebacic acid, decanedicarboxylic acid or adipic acid, or aromatic dicarboxylic acids, examples being $C_6$ to $C_{20}$ aromatic dicarboxylic acids or their derivatives, chlorides for example, such as 2,6-naphthalenedicarboxylic acid, isophthalic acid or terephthalic acid. Examples of polyamides of this kind are poly-2,4,4-trimethylhexamethyleneterephthalamide or poly-m-phenyleneisophthalamide, PA 6,6 (polyhexamethyleneadipamide), PA 4,6 (polytetramethyleneadipamide), PA 6,10 (polyhexamethylenesebacamide), PA 6/9, PA 6/12, PA 4/6, PA 12/12, the first number in each case indicating the number of carbon atoms in the diamine and the second number the number of carbon atoms in the dicarboxylic acid, PA 6T, or PA 9T.

Polyamides are likewise obtainable by polycondensation from amino acid, examples being $C_2$-$C_{20}$ amino acids such as 6-aminocaproic acid, 11-aminoundecanoic acid or by ring-opening polymerization from lactams, caprolactam for example. Examples of polyamides of this kind are PA 4 (synthesized from 4-aminobutyric acid), PA 6 (synthesized from 6-aminohexanoic acid). PA 11 is, for example, a polyundecanolactam, and PA 12 is a polydodecanolactam. In the case of polyamides which, as in this case, are synthesized only from one monomer, the number after the abbreviation PA indicates the number of carbon atoms in the monomer.

Polyamides can if appropriate be prepared with an elastomer as modifier. Examples of suitable copolyamides are block copolymers of the aforementioned polyamides with polyolefins, olefin copolymers, ionomers or chemically bonded or grafted elastomers; or with polyethers, such as with polyethylene glycol, polypropylene glycol or polytetramethylene glycol. Also suitable are EPDM- or ABS-modified polyamides or copolyamides, and polyamides condensed during processing (RIM polyamide systems).

Polyamide is used in injection moldings with stringent toughness, abrasion resistance, and thermal stability (dimensional stability) requirements, such as, for example, for plastic components in the engine compartment of automobiles; cogs, etc. In addition polyamide is used in synthetic fibers (e.g., nylon, Perlon).

(p) In a further preferred embodiment, the polymer is selected from polymers deriving from α,β-unsaturated acids and their derivatives, such as polyacrylates and polymethacrylates; polymethyl methacrylates (PMMA), polyacrylamides (PAA), and polyacrylonitriles (PAC), impact-modified by butyl acetate. Polyacrylic acids come about, as is known, through polymerization of acrylic acid. The polymerization can be carried out as a solution polymerization in water, as a precipitation polymerization in benzene, for example, or as a suspension polymerization.

Polyacrylic acid is used in the form of its salts as a thickener and in aqueous media for coatings. Polyacrylic acid and its copolymers with acrylamide are used as suspension aids for pigments, as flocculants in water treatment, as drilling aids in mining, as paper auxiliaries, as an adhesive for metal/plastic bonds, and for many other purposes. Polyacrylic esters are employed principally as binders for paints and coating materials, in the paper industry in coating slips and as binders and sizing agents, for the finishing of textiles, in adhesives and sealants, as leather assistants, as elastomers, and for many other purposes. A major field of use for PMMA is as a hardening component in binders of film-forming resins. In combination with acrylates it produces high-grade coatings distinguished by their long-term adhesion, film toughness, gloss, and weather resistance. Resins of this kind are used in primers and coatings, emulsion paints and varnishes. PAA is used principally as a flocculant in water treatment, as a paper auxiliary and as a flotation assistant in mining. In addition it is used as a clarifying aid for fruit juices, textile auxiliary, as a crosslinker in coatings, in the leather sector for example, as a thickener in paint dispersions, in adhesives, and in numerous other applications. Fields of use for PAC are knitware, home textiles (e.g., covers, curtains, upholstery), and carpets.

(q) In a further preferred embodiment, the polymer is selected from copolymers of the monomers identified in the above paragraph with one another or with other unsaturated monomers, such as acrylonitrile/butadiene copolymers, acrylonitrile/alkyl acrylate copolymers, acrylonitrile/alkoxyalkyl acrylate or acrylonitrile/vinyl halide copolymers, or acrylonitrile/alkyl methacrylate/butadiene terpolymers.

(r) In a further preferred embodiment, the polymer is selected from polystyrene, poly(p-methylstyrene), poly(α-methylstyrene), copolymers of styrene or α-methylstyrene with dienes or acrylic derivatives, or graft copolymers of styrene or α-methylstyrene.

(s) In a further preferred embodiment, the polymer is a copolymer of styrene with acrylonitrile and butadiene and/or acrylic or methacrylic esters.

Unmodified styrene polymers can be processed to form foam materials used in construction and in packaging. Copolymers of styrene or α-methylstyrene with dienes or acrylic derivatives comprise styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures with high impact toughness of styrene copolymers and another polymer, such as a polyacrylate, a diene polymer, or an ethylene/propylene/diene terpolymer; and block copolymers of styrene, such as styrene/butadiene/styrene, styrene/isoprene/styrene, styrene/ethylene/butylene/styrene or styrene/ethylene/propylene/styrene.

(t) In a further preferred embodiment, the polymer is a graft copolymer of styrene or α-methylstyrene. Examples are styrene on polybutadiene, styrene on polybutadiene-styrene or polybutadiene-acrylonitrile copolymers; styrene and acrylonitrile (or methacrylonitrile) on polybutadiene; styrene, acrylonitrile, and methyl methacrylate on polybutadiene; styrene and maleic anhydride on polybutadiene; styrene, acrylonitrile, and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, and also mixtures thereof with polyureas, polyimides, polyamide-imides, polyetherimides, polyesterimides, polyhydantoins, and polybenzimidazoles, examples being the copolymer mixtures known as ABS, MBS, ASA or AES polymers.

Prime applications for ABS are components, examples being casings for electrical and electronic devices (phones), and automotive components.

(u) In a further preferred embodiment, the polymer is a polymer blend. The term "polymer blend" refers to a mixture of two or more polymers or copolymers. Polymer blends serve to enhance the properties of the base component.

Examples of polymer blends or alloys comprise PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylates, POM/MBS, PPO/HIPS, PPO/PA 6,6 and copolymers, methyl methacrylate-acrylonitrile/butadiene/styrene polymers (MABS), PA/HDPE, PA/PP, PA/PPO, PBT/PC/ABS or PBT/PET/PC.

Acrylonitrile-butadiene-styrene copolymers (ABS) are thermoplastic or elastic polymer blends. They are produced by graft polymerizing the three base monomers, acrylonitrile, butadiene, and styrene, in an emulsion polymerization process or bulk polymerization process. The properties of ABS can be controlled via the proportions of the monomers employed.

Preferred polymers are selected from the classes of polyamides, polyesters, polycarbonates, polystyrenes and other olefinics, and polyurethanes.

The polymeric material may optionally contain various conventional additives.

Suitable conventional additives comprise e.g. antioxidants, UV absorbers/light stabilizers, metal deactivators, antistatic agents, reinforcing agents, fillers, antifogging agents, biocides, plasticisers, lubricants, emulsifiers, colorants, pigments, rheology additives, mold release agents, tackifiers, catalysts, flow-control agents, optical brighteners, further flameproofing agents (different from the cyclic or polymeric aryl phosphines of the invention), antidripping agents and blowing agents.

The antioxidants, light stabilizers, and metal deactivators that are optionally used have a high migration fastness and temperature resistance. Suitable antioxidants, UV absorbers/light stabilizers, and metal deactivators are selected, for example, from groups a) to t). The compounds of groups a) to g) and i) represent UV absorbers/light stabilizers, whereas compounds of groups j) to t) work in particular as stabilizers:
a) 4,4-diarylbutadienes,
b) cinnamic esters,
c) benzotriazoles,
d) hydroxybenzophenones,
e) diphenylcyanoacrylates,
f) oxalic diamides,
g) 2-phenyl-1,3,5-triazines;
h) antioxidants,
i) nickel compounds,
j) sterically hindered amines,
k) metal deactivators,
l) phosphites and phosphonites,
m) hydroxylamines,
n) nitrones,
o) amine oxides,
p) benzofuranones and indolinones,
q) thiosynergists,
r) peroxide scavengers,
s) polyamide stabilizers, and
t) basic costabilizers.

Group a) of the 4,4-diarylbutadienes includes for example compounds of the formula A.

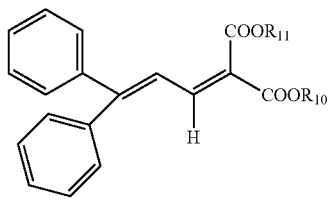

(A)

The compounds are known from EP-A-916 335. The substituents $R_{10}$ and/or $R_{11}$ are preferably $C_1$-$C_8$ alkyl and $C_5$-$C_8$ cycloalkyl.

Group b) of the cinnamic esters includes for example isoamyl 4-methoxycinnamate, 2-ethylhexyl 4-methoxycinnamate, methyl α-methoxycarbonylcinnamate, methyl α-cyano-β-methyl-p-methoxycinnamate, butyl α-cyano-β-methyl-p-methoxycinnamate, and methyl α-methoxycarbonyl-p-methoxycinnamate.

Group c) of the benzotriazoles includes for example 2-(2'-hydroxyphenyl)-benzotriazoles such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl) benzotriazole, 2-(2'-hydroxy-5'-(1,1,3,3-tetramethylbutyl) phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)-benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy) carbonylethyl]-2'-hydroxyphenyl)-5-chlorobenzotriazole, 2-(3'-tert-butyl-2'-hydroxy-5'-(2-methoxycarbonylethyl) phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole and 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazol-2-ylphenol]; the product of esterifying 2-[3'-tert-butyl-5'-(2-methoxycarbonylethyl)-2'-hydroxyphenyl]-2H-benzotriazole with polyethylene glycol 300; $[R\text{—}CH_2CH_2\text{—}COO(CH_2)_3]_2$ where R=3'-tert-butyl-4'-hydroxy-5'-2H-benzotriazol-2-ylphenyl, and mixtures thereof.

Group d) of the hydroxybenzophenones includes for example 2-hydroxybenzophenones such as 2-hydroxy-4-methoxybenzophenone, 2,2'-dihydroxy-4-methoxy-benzophenone, 2,4-dihydroxybenzophenone, 2,2',4,4'-tetrahydroxybenzophenone, 2,2'-dihydroxy-4,4'-dimethoxybenzophenone, 2,2'-dihydroxy-4,4'-dimethoxybenzophenone, 2-hydroxy-4-(2-ethylhexyloxy) benzophenone, 2-hydroxy-4-(n-octyloxy)benzophenone, 2-hydroxy-4-methoxy-4'-methylbenzophenone, 2-hydroxy-3-carboxybenzophenone, 2-hydroxy-4-methoxybenzophenone-5-sulfonic acid and its sodium salt, and 2,2'-dihydroxy-4,4'-dimethoxybenzophenone-5,5'-bissulfonic acid and its sodium salt.

Group e) of the diphenylcyanoacrylates includes for example ethyl 2-cyano-3,3-diphenylacrylate, obtainable commercially for example under the name Uvinul® 3035 from BASF AG, Ludwigshafen, Germany, 2-ethylhexyl 2-cyano-3,3-diphenylacrylate, obtainable commercially for example as Uvinul® 3039 from BASF AG, Ludwigshafen, and 1,3-bis[(2'-cyano-3',3'-diphenylacryloyl)oxy]-2,2-bis{[2'-cyano-3',3'-diphenylacryloyl)oxy]methyl}propane, obtainable commercially for example under the name Uvinul® 3030 from BASF AG, Ludwigshafen.

Group f) of the oxamides (oxalic diamides) includes for example 4,4'-dioctyloxyoxanilide, 2,2'-diethoxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butyloxanilide, and also mixtures of ortho-, para-methoxy-disubstituted oxanilides and mixtures of ortho- and para-ethoxy-disubstituted oxanilides.

Group g) of the 2-phenyl-1,3,5-triazines includes for example 2-(2-hydroxyphenyl)-1,3,5-triazines such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis-(2,4-dimethylphenyl)-1,3,5-triazine, 2-[2-hydroxy-4-(2-hydroxy-3-butyloxypropoxy)-phenyl]-4,6-bis(2,4-dimethylphenyl)-1,3,5-triazine, 2-[2-hydroxy-4-(2-hydroxy-3-octyloxypropoxy)phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, and 2-(2-hydroxyphenyl)-4-(4-methoxyphenyl)-6-phenyl-1,3,5-triazine.

Group h) of the antioxidants includes, for example:

h.1) Alkylated monophenols such as, for example, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methyl-phenol, 2-(α-methylcyclohexyl)-4,6-dimethylphenol, 2,6-d ioctadecyl-4-methylphenol, 2,4,6-tricyclohexylphenol, 2,6-di-tert-butyl-4-methoxymethylphenol, unbranched or sidechain-branched nonylphenols such as, for example, 2,6-dinonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol, and mixtures thereof.

h.2) Alkylthiomethylphenols such as, for example, 2,4-dioctylthiomethyl-6-tertbutylphenol, 2,4-dioctylthiomethyl-6-methylphenol, 2,4-dioctylthiomethyl-6-ethylphenol and 2,6-didodecylthiomethyl-4-nonylphenol.

h.3) Hydroquinones and alkylated hydroquinones such as, for example, 2,6-di-tert-butyl-4-methoxyphenol, 2,5-di-tert-butylhydroquinone, 2,5-di-tert-amyl-hydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, and bis-(3,5-di-tert-butyl-4-hydroxyphenyl) adipate.

h.4) Tocopherols, such as, for example, α-tocopherol, β-tocopherol, γ-tocopherol, δ-tocopherol, and mixtures thereof (vitamin E).

h.5) Hydroxylated thiodiphenyl ether such as, for example, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), and 4,4'-bis(2,6-dimethyl-4-hydroxyphenyl)disulfide.

h.6) Alkylidenebisphenols such as, for example, 2,2'-methylenebis(6-tert-butyl-4-methylphenol), 2,2'-methylenebis(6-tert-butyl-4-ethylphenol), 2,2'-methylene-bis[4-methyl-6-(α-methylcyclohexyl)phenol], 2,2'-methylenebis(4-methyl-6-cyclohexylphenol), 2,2'-methylene-bis(4,6-di-tert-nonyl-4-methylphenol), 2,2'-methylene-bis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis-(6-tert-butyl-2-methylphenol), 1,1-bis(5-tert-butyl-4-hydroxy-2-methylphenyl)-butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3-tert-butyl-4-hydroxyphenyl)butyrate], bis(3-tert-butyl-4-hydroxy-5-methyl-phenyl)dicyclopentadiene, bis[2-(3'-tert-butyl-2-hydroxy-5-methylbenzyl)-6-tert-butyl-4-methylphenyl]terephthalate, 1,1-bis(3,5-dimethyl-2-hydroxyphenyl)-butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane.

h.7) Benzyl compounds such as, for example, 3,5,3',5'-tetra-tert-butyl-4,4'-dihydroxy-dibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxy-benzyl)amine, 1,3,5-tri(3,5-di-tert-butyl-4-hydroxybenzyl)-2,4,6-trimethylbenzene, di(3,5-di-tert-butyl-4-hydroxybenzyl)sulfide, isooctyl 3,5-di-tert-butyl-4-hydroxy-benzylmercaptoacetate, bis(4-tert-butyl-3-hydroxy-2,6-dimethylbenzyl)dithiol terephthalate, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 3,5-di-tert-butyl-4-hydroxybenzyl-phosphoric acid dioctadecyl ester, and 3,5-di-tert-butyl-4-hydroxybenzyl-phosphoric acid monoethyl ester, calcium salt.

h.8) Hydroxybenzylated malonates such as, for example, dioctadecyl 2,2-bis(3,5-di-tert butyl-2-hydroxybenzyl)malonate, dioctadecyl-2-(3-tert-butyl-4-hydroxy-5-methylbenzyl)malonate, didodecyl mercaptoethyl-2,2-bis(3,5-di-tert-butyl-4-hydroxybenzyl)malonate, and bis[4-(1,1,3,3-tetramethylbutyl)phenyl] 2,2-bis(3,5-di-tert-butyl-4-hydroxybenzyl)malonate.

h.9) Hydroxybenzyl aromatics such as, for example, 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, and 2,4,6-tris(3,5-di-tert-butyl-4-hydroxybenzyl)phenol.

h.10) Triazine compounds such as, for example, 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,3,5-triazine, 1,3,5-tris(3,5-di-tert-butyl-4-hydroxybenzyl) isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, and 1,3,5-tris(3,5-dicyclohexyl-4-hydroxybenzyl)isocyanurate.

h.11) Benzylphosphonates such as, for example, dimethyl 2,5-di-tert-butyl-4-hydroxy-benzylphosphonate, diethyl 3,5-di-tert-butyl-4-hydroxybenzylphosphonate (diethyl (3,5-bis(1,1-dimethylethyl)-4-hydroxyphenyl)methylphosphonate), dioctadecyl 3,5-di-tert-butyl-4-hydroxybenzylphosphonate, dioctadecyl 5-tert-butyl-4-hydroxy-3-methylbenzylphosphonate, and the calcium salt of monoethyl 3,5-di-tert-butyl-4-hydroxybenzylphosphonate.

h.12) Acylaminophenols such as, for example, 4-hydroxylauranilide, 4-hydroxy-stearanilide, 2,4-bisoctylmercapto-6-(3,5-di-(tert-butyl)-4-hydroxyanilino)-s-triazine, and octyl N-(3,5-di-tert-butyl-4-hydroxyphenyl)carbamate.

h.13) Esters of β-(3,5-di-tert-butyl-4-hydroxyphenyl)propionic acid with monohydric or polyhydric alcohols such as, for example, with methanol, ethanol, n-octanol, iso-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxalamide, 3-thiaundecanol, 3-thiapentadecanol, trimethylhexanediol, trimethylolpropane, and 4-hydroxymethyl-1-phospha-2,6,7-trioxabicyclo-[2.2.2]octane.

h.14) Esters of β-(5-tert-butyl-4-hydroxy-3-methylphenyl) propionic acid with monohydric or polyhydric alcohols such as, for example, with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxalamide, 3-thiaundecanol, 3-thiapentadecanol, trimethylhexanediol, trimethylolpropane, and 4-hydroxymethyl-1-phospha-2,6,7-trioxa-bicyclo[2.2.2]octane.

h.15) Esters of β-(3,5-dicyclohexyl-4-hydroxyphenyl)propionic acid with monohydric or polyhydric alcohols such as, for example, with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxalamide, 3-thiaundecanol, 3-thiapentadecanol, trimethylhexanediol, trimethylolpropane, and 4-hydroxymethyl-1-phospha-2,6,7-trioxabicyclo[2.2.2]octane.

h.16) Esters of 3,5-di-tert-butyl-4-hydroxyphenylacetic acid with monohydric or polyhydric alcohols such as, for example, with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxalamide, 3-thiaundecanol, 3-thiapentadecanol, trimethylhexanediol, trimethylolpropane, and 4-hydroxymethyl-1-phospha-2,6,7-trioxabicyclo[2.2.2]octane.

h.17) Amides of β-(3,5-di-tert-butyl-4-hydroxyphenyl)propionic acid such as, for example, N,N'-bis(3-(3,5-di-tert-butyl-4-hydroxyphenyl)-propionyl)hexamethylenediamine, N,N'-bis(3-(3,5-di-tert-butyl-4-hydroxyphenyl)-propionyl)trimethylenediamine, N,N'-bis(3-(3,5-di-tert-butyl-4-hydroxyphenyl)-propionyphydrazine, N,N'-bis[2-(3-[3,5-di-tert-butyl-4-hydroxyphenyl]propionyloxy)ethyl]oxamide (e.g., Naugard®XL-1 from Uniroyal).

h.18) Ascorbic acid (vitamin C)

h.19) Aminic antioxidants such as, for example, N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example, p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl) biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one, 2,2,6,6-tetramethylpiperidin-4-ol, the dimethyl succinate polymer with 4-hydroxy-2,2,6,6-tetramethyl-1-piperidineethanol [CAS number 65447-77-0], (for example, Tinuvin® 622 from Ciba Specialty Chemicals, Switzerland), polymer of 2,2,4,4-tetramethyl-7-oxa-3,20-diaza-dispiro[5.1.11.2]heneicosan-21-one and epichlorohydrin [CAS No.: 202483-55-4], (for example Hostavin® N30 from Clariant, Frankfurt am Main, Germany.).

Group i) of the nickel compounds includes for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyl-diethanolamine, nickel dibutyl dithiocarbamate, nickel salts of 4-hydroxy-3,5-di-tert-butylbenzylphosphonic acid monoalkyl esters such as of the methyl or ethyl esters, for example, nickel complexes of ketoximes such as, for example, of 2-hydroxy-4-methyl-phenyl undecyl ketoxime, and the nickel complex of 1-phenyl-4-lauroyl-5-hydroxy-pyrazole, with or without additional ligands.

Group j) of the sterically hindered amines includes for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, condensation product of 1-(2-hydroxyethyl)-2,2,6,6-tetramethyl-4-hydroxypiperidine and succinic acid, the condensation product of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetra-kis(2,2,6,6-tetramethyl-4-piperidyl) 1,2,3,4-butanetetracarboxylate, 1,1'-(1,2-ethylene)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethyl-4-piperidyl) 2-n-butyl-2-(2-hydroxy-3,5-di-tert-butylbenzyl)malonate, 3-n-octyl-7,7,9,9-tetramethyl-1,3,8-triazaspiro[4.5] decane-2,4-dione, bis(1-octyloxy-2,2,6,6-tetramethyl-4-piperidyl)sebacate, bis(1-octyloxy-2,2,6,6-tetramethyl-4-piperidyl)succinate, condensation product of 2-chloro-4,6-bis(4-n-butylamino-2,2,6,6-tetramethyl-4-piperidyl)-1,3,5-triazine and 1,2-bis(3-aminopropylamino)ethane, condensation product of 2-chloro-4,6-di-(4-n-butylamino-1,2,2,6,6-pentamethyl-4-piperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)-pyrrolidine-2,5-dione, mixture of 4-hexadecyloxy- and 4-stearyloxy-2,2,6,6-tetramethylpiperidine, condensation product of N,N'-bis(2,2,6,6-tetramethyl-4-piperidyphexamethylenediamine and 4-cyclohexylamino-2,6-dichloro-1,3,5-triazine, condensation product of 1,2-bis(3-aminopropylamino)ethane and 2,4,6-trichloro-1,3,5-triazine and also 4-butylamino-2,2,6,6-tetramethylpiperidine, N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro-[4.5] decane, condensation product of 7,7,9,9-tetramethyl-2-cycloundecyl-1-oxa-3,8-diaza-4-oxospiro[4.5]decane and epichlorohydrin, poly[methoxypropyl-3-oxo-4-(2,2,6,6-tetramethyl-4-piperidyl)]siloxane, polymer-analogous reaction products derived from 4-amino-2,2,6,6-tetramethylpiperidine and maleic acid/$C_{20}$-$C_{24}$-α-olefin copolymers, e.g., Uvinul® 5050 H (BASF Aktiengesellschaft, Ludwigshafen), and corresponding with polymer-analogous reaction products, 4-amino-1,2,2,6,6-pentamethylpiperidine (e.g., "methylated Uvinul® 5050 H"), condensation products of tetramethylolacetylenediurea and 4-amino-2,2,6,6-tetramethylpiperidine, e.g., Uvinul® 4049 H (BASF Aktiengesellschaft, Ludwigshafen), and corresponding condensation products with 4-amino-1,2,2,6,6-pentamethylpiperidine (e.g., "methylated Uvinul® 4049 H"), poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]] [CAS No. 71878-19-8], N,N,N',N'-tetrakis{4,6-bis[butyl-(N-methyl-2,2,6,6-tetramethyl-4-piperidin-4-yl)amino]-triazin-2-yl}-4,7-diazadecane-1,10-diamine (CAS No. 106990-43-6) (e.g., Chimassorb® 119 from Ciba Specialty Chemicals, Switzerland).

Group k) of the metal deactivators includes for example N,N'-diphenyloxalamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)-oxalyl dihydrazide, oxanilide, isophthaloyl dihydrazide, sebacoylbisphenyl hydrazide, N,N'-diacetyladipic dihydrazide, N,N'-bis(salicyloyl)oxalic dihydrazide, and N,N'-bis(salicyloyl)thiopropionyl dihydrazide.

Group l) of the phosphites and phosphonites includes for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-dibenzo[d,f][1,3,2]-dioxaphosphepine, 6-fluoro-2,4,8,10-tetra-tert-butyl-12-methyld ibenzo[d,g][1,3,2]-dioxaphosphocine, bis(2,4-di-tert-butyl-6-methylphenyl) methyl phosphite, bis(2,4-di-tert-butyl-6-methylphenyl) ethyl phosphite, 2,2',2''-nitrilo[triethyltris(3,3',5,5'-tetra-tert-butyl-1,1'-biphenyl-2,2'-diyl)phosphite], and 2-ethylhexyl 3,3',5,5'-tetra-tert-butyl-1,1'-biphenyl-2,2'-diyl phosphite.

Group m) of the hydroxylamines includes for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecyl-hydroxylamine, N-hexadecyl-N-octadecylhydroxylamine, N-heptadecyl-N-octa-decylhydroxylamine, N-methyl-N-octadecylhydroxylamine, and N,N-dialkylhydroxyl-amine from hydrogenated tallow fatty amines.

Group n) of the nitrones includes for example N-benzyl α-phenyl nitrone, N-ethyl α-methyl nitrone, N-octyl α-heptyl nitrone, N-lauryl α-undecyl nitrone, N-tetradecyl α-tridecyl nitrone, N-hexadecyl α-pentadecyl nitrone, N-octadecyl α-heptadecyl nitrone, N-hexadecyl α-heptadecyl nitrone, N-octadecyl α-pentadecyl nitrone, N-heptadecyl α-heptadecyl nitrone, N-octadecyl α-hexadecyl nitrone, N-methyl α-heptadecyl nitrone, and nitrones derived from N,N-dialkylhydroxylamines prepared from hydrogenated tallow fatty amines.

Group o) of the amine oxides includes for example amine oxide derivatives as described in U.S. Pat. Nos. 5,844,029 and 5,880,191, didecylmethylamine oxide, tridecylamine oxide, tridodecylamine oxide and trihexadecylamine oxide.

Group p) of the benzofuranones and indolinones includes for example those described in U.S. Pat. Nos. 4,325,863; 4,338,244; 5,175,312; 5,216,052; 5,252,643; in DE-A-4316611; in DE-A-4316622; in DE-A-4316876; in EP-A-0589839 or EP-A-0591102, or 3-[4-(2-acetoxyethoxy)phenyl]-5,7-di-tert-butylbenzofuran-2-(3H)-one, 5,7-di-tert-butyl-3-[4-(2-stearoyloxyethoxy)phenyl]benzofuran-2-(3H)-one, 3,3'-bis[5,7-di-tert-butyl-3-(4-[2-hydroxyethoxy] phenyl)benzofuran-2-(3H)-one], 5,7-di-tert-butyl-3-(4-ethoxyphenyl)-benzofuran-2-(3H)-one, 3-(4-acetoxy-3,5-dimethylphenyl)-5,7-di-tert-butyl-benzofuran-2-(3H)-one, 3-(3,5-dimethyl-4-pivaloyloxyphenyl)-5,7-di-tert-butyl-benzofuran-2-(3H)-one, 3-(3,4-dimethylphenyl)-5,7-di-tert-butyl-benzofuran-2-(3H)-one, Irganox® HP-136 from Ciba Specialty Chemicals, and 3-(2,3-dimethylphenyl)-5,7-di-tert-butyl-benzofuran-2-(3H)-one.

Group q) of the thiosynergists includes for example dilauryl thiodipropionate or distearyl thiodipropionate.

Group r) of the peroxide scavengers includes for example esters of β-thiodipropionic acid, for example, the lauryl, stearyl, myristyl or tridecyl ester, mercaptobenzimidazole or the zinc salt of 2-mercaptobenzimidazole, zinc dibutyldithiocarbamate, dioctadecyl disulfide, and pentaerythritol tetrakis (β-dodecylmercapto)propionate.

Group s) of the polyamide stabilizers includes, for example, copper salts in combination with iodides and/or phosphorus compounds and salts of divalent manganese.

Group t) of the basic costabilizers includes for example melamine, polyvinylpyrrolidone, dicyandiamide, triallylcyanurate, urea derivatives, hydrazine derivatives, amines, polyamides, polyurethanes, alkali metal and alkaline earth metal salts of higher fatty acids, for example, calcium stearate, zinc stearate, magnesium behenate, magnesium stearate, sodium ricinoleate, and potassium palmitate, antimony pyrocatecholate or zinc pyrocatecholate.

Suitable light stabilizers include, in particular, diphenylcyanoacrylates such as ethyl 2-cyano-3,3-diphenylacrylate.

Also particularly suitable as light stabilizer are sterically hindered amines. Very particular preference is given to polymer-analogous reaction products of 4-amino-2,2,6,6-tetramethylpiperidine and maleic acid/$C_{20}$-$C_{24}$ α-olefin copolymers, an example being Uvinul® 5050 H (BASF Aktiengesellschaft, Ludwigshafen, Germany) and the corresponding polymer-analogous reaction products with 4-amino-1,2,2,6,6-pentamethylpiperidine (e.g. "methylated Uvinul® 5050 H").

The polymeric material may also comprise at least one additive selected from antistatic agents, fillers or reinforcing agents, and nucleating agents (group u).

Examples of suitable antistatic agents include amine derivatives such as N,N-bis(hydroxyalkyl)alkylamines or -alkylenamines, polyethylene glycol esters and ethers, ethoxylated carboxylic esters and carboxamides, and glycerol monostearates and distearates, and also mixtures thereof.

Suitable fillers or reinforcing agents comprise, for example, pigments, such as carbon black, graphite, calcium carbonate, silicates, talc, mica, kaolin, bentonite, barium sulfate, metal oxides and metal hydroxides, wood flour and fine powders or fibers of other natural products, and synthetic fibers. Examples of suitable fibrous or pulverulent fillers further include carbon fibers or glass fibers in the form of glass fabrics, glass mats or filament glass rovings, chopped glass, glass beads, and wollastonite. Glass fibers can be incorporated both in the form of short glass fibers and in the form of continuous fibers (rovings).

Suitable pigments comprise, for example, carbon black, graphite, titanium dioxide, iron oxide and the like.

Suitable colorants comprise, for example, phthalocyanine dyes.

The polymeric material may further comprise nucleating agents. Suitable nucleating agents comprise, for example, inorganic materials, such as talc, metal oxides such as titanium oxide or magnesium oxide, phosphates, carbonates or sulfates of preferably alkaline earth metals; organic compounds such as monocarboxylic or polycarboxylic acids and also their salts, such as 4-tert-butylbenzoic acid, adipic acid, diphenylacetic acid, sodium succinate or sodium benzoate; polymeric compounds, such as ionic copolymers ("ionomers"), for example.

The compounds from groups a) to t), with the exception of the benzofuranones of group p), are used in typical amounts, in amounts for example of 0.0001% to 10% by weight, preferably 0.01% to 1% by weight, based on the total weight of the polymeric material. The additives of the group u) are used in the typical amounts. Typically they are used in an amount of 0 to 60% by weight, based on the total weight of the polymeric material.

The polymeric material may further comprise a lubricant. Examples for lubricants are metal soap, such as calcium stearate, magnesium stearate or zinc stearate, butyl stearate, palmityl stearate, glycerol monostearate, ethylene bisstearyl amide, methylene bisstearyl amide, palmitic amide, stearic acid, behanic acid, polyethylene wax and the like.

The polymeric material may further comprise a further conventional flame retardant. Examples for conventional flame retardants, which are optionally present in the polymeric material, are those listed in the introductory part.

Preferred conventional flame retardants are the hydroxides, oxides and oxide hydrates of group 2, 4, 12, 13, 14 and 15 (semi)metals, nitrogen-based flame retardants and phosphorous-based flame retardants.

Examples for hydroxides, oxides and oxide hydrates of group 2, 4, 12, 13, 14 and 15 (semi)metals are magnesium oxide or hydroxide, aluminium oxide, aluminum trihydrate, silica, tin oxide, antimony oxide (III and V) and oxide hydrate, titanium oxide and zinc oxide or oxide hydrate.

Examples for nitrogen-based flame retardants are melamine and urea based resins and melamine cyanurate and melamine borate.

Examples for phosphorous-based flame retardants are red phosphorous, ammonium polyphosphates, phosphoric esters, in particular triarylphosphates, such as triphenyl phosphate, tribenzyl phosphate, tricresyl phosphate, tri-(dimethylphenyl)phosphate, benzyl dimethylphosphate, di-(dimethylphenyl)phenyl phosphate, resorcinol-bis(diphenyl phosphate), recorcinol-bis-[di-(2,6-dimethylphenyl)-phosphate] (PX-200), aluminum diethylphosphinate (Exolit® OP 1230), but also aliphatic phosphates, such as tris(2-chloroisopropyl) phosphate (Lupragen® TCPP), aromatic polyphosphates, e.g. polyphosphates derived from bisphenols, such as the compounds described in US 2004/0249022), and phosphonic esters, such as dimethyl-methyl phosphonate and phosphonic acid (2-((hydroxymethyl)carbamyl)ethyl)dimethylester, and polycyclic phosphorous-containing compounds, such as 9,10-dihydro-9-oxa-10-phosphaphenanthrene-10-oxide (DOPO).

In one preferred embodiment, the polymeric material does not contain a further flame retardant selected from halogen-based flame retardants. In one embodiment, the polymeric material does not contain a further flame retardant apart from the cyclic and/or polymeric phosphine of the invention.

In yet another preferred embodiment, the polymeric material, apart the the cyclic and/or polymeric phosphine of the invention, contains a further flame retardant and/or a synergist. Synergists are compounds which improve the effect of the proper flame retardant, often in an overadditive (synergistic) manner. Synergists which advantageously can be combined with the cyclic and/or polymeric phosphine of the invention are selected from hydroxides, oxides and oxide hydrates of group 2, 4, 12, 13, 14 and 15 (semi)metals, such as magnesium oxide or hydroxide, aluminium oxide, aluminum trihydrate, silica, tin oxide, antimony oxide (III and V) and oxide hydrate, titanium oxide and zinc oxide or oxide hydrate, from further zinc compounds, such as zinc borate, zinc stannate or zinc sulfide, from nitrogen-based flame retardants, such as melamine and urea based resins, melamine cyanurate, melamine borate, melamine phosphate, melamine polyphosphate or melamine pyrophosphate, and from phosphorous-based flame retardants, such as phosphinate metal salts, such as aluminum diethylphosphinate (Exolit® OP 1230), phosphates, such as resorcinol-bis[diphenyl phosphate], resorcinol-bis[di-(2,6-dimethylphenyl)-phosphate] (PX-200), or tris(2-chloroisopropyl)phosphate (Lupragen® TCPP), phosphonic esters, such as dimethyl-methyl phosphonate, polycyclic phosphorus-containing compounds, such as 9,10-dihydro-9-oxa-10-phosphaphenanthrene-10-oxide (DOPO) or derivatives thereof. Other synergists can be materials based on the phenolic novolac family, such as those obtained from phenol-formaldehyde condensation reactions. Preferred synergists are Ti(IV) oxide, silicium dioxide, aluminium oxide, aluminium trihydrate, zinc oxide, zinc borate, magnesium oxide, magnesium hydroxide, melamine and urea based resins, melamine cyanurate, melamine borate and melamine phosphates.

The above-mentioned hydroxides, oxides and oxide hydrates in general also possess antidripping properties. Further examples for antidripping agents are polytetrafluoroethylenes.

The choice of suitable further additive depends in each case on the specific polymer to be compounded as well as on its end use and can be established by the skilled person.

Optional co-additives found particularly useful for use with the instant compounds of formula (I) are the above-described synergists, in particular phosphinate metal salts such as Exolit® OP-930, DOPO or derivatives thereof and aluminium trihydrate.

The polymeric material can be equipped with compound(s) of formula (I) and/or with the polymer(s) containing repeating units II (and with the optional additives) before, during or after the preparation of the polymer.

The compound(s) of formula (I) and/or the polymer(s) containing repeating units II and the optional further components may be added to the polymeric material individually or mixed with one another. If desired, the individual components can be mixed with one another before incorporation into the polymer for example by dry blending, compaction or in the melt.

Equipping the polymeric material with the compound(s) of formula (I) and/or with the polymer(s) containing repeating units II and the optional further additives is carried out by known methods such as dry blending in the form of a powder, or wet mixing in the form of solutions, dispersions or suspensions, for example in an inert solvent, water or oil. The compounds of formula (I) and/or the polymers containing repeating units II and optional further additives may be incorporated, for example, before or after molding or also by applying the dissolved or dispersed additive or additive mixture to the polymer material, with or without subsequent evaporation of the solvent or the suspension/dispersion agent. They may be added directly into the processing apparatus (e.g. extruders, internal mixers, etc), e.g. as a dry mixture or powder or as solution or dispersion or suspension or melt.

The incorporation can be carried out in any heatable container equipped with a stirrer, e.g. in a closed apparatus such as a kneader, mixer or stirred vessel. The incorporation is for example carried out in an extruder or in a kneader. In general, it is immaterial whether processing takes place in an inert atmosphere or in the presence of oxygen.

The addition of the additive or additive blend to the polymer can be carried out in all customary mixing machines in which the polymer is melted and mixed with the additives. Suitable machines are known to those skilled in the art. They are predominantly mixers, kneaders and extruders, but also roll mills, roll mixers with heated rolls, and calenders.

The process is for instance carried out in an extruder by introducing the additive(s) during processing. Specific examples of suitable processing machines are single-screw extruders, contrarotating and corotating twin-screw extruders, multiscrew extruders, planetary-gear extruders, ring extruders or cokneaders. It is also possible to use processing machines provided with at least one gas removal compartment to which a vacuum can be applied. In one specific embodiment, a twin-screw extruder is used.

Suitable extruders and kneaders are described, for example, in Handbuch der Kunststoffextrusion, Vol. 1 Grundlagen, Editors F. Hensen, W. Knappe, H. Potente, 1989, pp. 3-7, ISBN: 3-446-14339-4 (Vol. 2 Extrusionsanlagen 1986, ISBN 3-446-14329-7).

If a plurality of components are added, these can be premixed or added individually.

The polymer component can be supplied in melted form, but generally in solid form, to the mixing apparatus used in accordance with the invention. If the polymer component is used in solid form then it may take the form of granules, powder, pellets or grind-stock. In that case the polymer component is melted at temperatures of 150 to 300° C., for example.

The polymer component, the compound(s) of formula (I) and/or the polymer(s) containing repeating units II and any further optional additives can also be mixed "cold" and the mixture thereafter is melted and homogenized. Suitable temperatures are typically in the range from 150 to 300° C.

The compounds of formula (I) and/or the polymers containing repeating units II and optional further additives can also be sprayed onto the polymer material. Addition by spraying during the deactivation of the polymerization catalysts is particularly advantageous; in this case, the steam evolved may be used for deactivation of the catalyst. In the case of spherically polymerized polyolefins it may, for example, be advantageous to apply the compounds of formula (I) and/or the polymers containing repeating units II, optionally together with other additives, by spraying.

The compounds of formula (I) and/or the polymers containing repeating units II and optionally further additives can also be added to the polymer in the form of a master-batch ("concentrate") which contains the components in a concentration of, for example, about 1% to about 40%, for example about 2% to about 20% by weight, based on the total weight of the concentrate, incorporated in a polymer. The polymer must not be necessarily of identical structure than the polymer where the additives are added finally. In such operations, the polymer can be used in the form of powder, granules, solutions, suspensions or in the form of latices.

The compounds of formula (I) and also the polymers containing repeating units II can advantageously be added to the polymer component in the form of coated capsules, the compound of formula (I) and/or and the polymer containing repeating units II forming the capsule core which is surrounded by a suitable coating material. Suitable coating materials are those which protect the cyclic and/or polymeric phosphine of the invention from the detrimental effect which may be caused by oxygen and moisture and which form a suitable coating. Suitable coating materials are the fillers listed in the introductory part as anti-dripping agents, the materials listed as suitable synegists for the cyclic and/or polymeric phosphine of the invention and also resins such as melamine resins. Preferably, the coating material is chosen so as to provide a flame retardant effect too, and in particular so as to act as a synergist for the cyclic and/or polymeric phosphine of the invention, i.e. to improve their effectiveness as flame retardants. Preferred coating materials are (semi)metal hydroxides, (semi)metal oxides and (semi)metal oxide hydrates, such as aluminum trihydrate ($Al(OH)_3$), magnesium oxide, magnesium hydroxide, zinc hydroxide, zinc oxide, silica, tin oxide, tin oxide hydrate, antimony oxide (III and V) and titaniumdioxide, and in particular aluminum trihydrate, optionally in combination with a further hydroxide or oxide, such as magnesium hydroxide, zinc hydroxide, zinc oxide or lead hydroxide. The coating can be carried out in analogy to the coating process described in U.S. Pat. No. 4,210,630, e.g. by treating an aqueous suspension of a compound of formula (I) or of a polymer containing repeating units II with a water soluble salt of one or more of the above-mentioned (semi)metals in the presence of a base, such as an alkali hydroxide or an alkali or earth alkaline carbonate. The resulting (semi)metal hydroxide precipitates on the dispersed particles of the compound (I) or of the polymer containing repeating units II. Preferably, the coated capsules have a mean (median) diameter of 1 μm to about 100 μm.

Incorporation of the compound(s) (I) and/or of the polymer(s) containing repeating units II and the optional additives can take place prior to or during the shaping operation.

The compound(s) (I) and/or of the polymer(s) containing repeating units II can also be incorporated to the polymeric material by adding them to the monomers from which the polymers are derived and polymerizing the monomers. In this case, polymer(s) containing repeating units II may be copolymerized with the monomers and yield a polymeric material with incorporated units II.

The materials containing the compounds of formula (I) and/or the polymers containing repeating units II described herein are for example used for the production of molded articles, for example rotomolded articles, injection molded articles, blow molded articles, (extruded) profiles, mono- and multilayer films, laminates, e.g. textile laminates, surface coatings and the like.

Just a few examples for (semi)finished products suitable to be flame-retarded by the compounds of formula (I) are: thermoplastic olefins, paintable thermoplastic olefins, polypropylene molded articles, polyethylene film, thermoplastic elastomers with other costabilizers, grease-filled wire and cable insulation, coatings over plastic substrates, polyolefin tanks or containers containing chemicals, polyolefin films with an antifog agent, polyolefin films with IR thermal fillers such as hydrotalcites, e.g. DHT4A, polyolefin films with an antistatic agent, pre-formed films for lamination to plastic substrates, parts of electric and electronic appliances such as cabinets and housing for television sets, connectors, wires, cables, plugs spacers etc., containers, boxes, bins for storage and transportation, automotive applications, e.g. dashboard or back board, polymer components inside mass transportation vehicles (airplanes, busses, subways etc.), furniture, e.g. stadium seats or public seats, upholstery, mattresses etc., materials used in construction, e.g. thermal insulating materials such as roofing sheets, roofing membranes, flooring materials, liners, profiles, for example window and door profiles, etc. further shower stalls, tubs, awning fabrics etc., fabrics, such as drapery, carpeting, children's sleepware, worker's clothing, tents, tarpaulins, parachutes, ropes, nets, tire cords etc., surgical gowns, caps and other hospital applications.

Preferably, the compounds of formula (I) and/or the polymers containing repeating units II are incorporated into the polymeric material in an amount of from 1 to 35% by weight or from 1 to 20% by weight, more preferably from 1 to 15% by weight, even more preferably from 3 to 15% by weight, e.g. from 6 to 13% by weight or from 6 to 12% by weight, and in particular from 8 to 15% by weight, e.g. from 8 to 13% by weight or from 8 to 12% by weight, based on the weight of the polymeric material.

In a further aspect, the invention provides a method for flame retarding or reducing the flammability of organic material which comprises incorporating into the material at least one compound of formula I as defined above and/or at least one polymer containing repeating units II as defined above. The remarks made above as to preferred embodiments of compounds (I) and of polymers containing repeating units II, to suitable and preferred polymeric materials and optional additives and to methods for incorporating the compound (I) and also further optional additives into the polymeric materials apply here, too.

In a further aspect, the invention provides a polymeric composition, comprising (a) at least one compound of formula I as defined above and/or at least one polymer containing repeating units of the formula II as defined above; and
(b) a polymeric material, except for epoxy resins and epoxy resins containing materials;
where the component (a) is comprised in an amount of from 1 to 15% by weight, based on the weight of the polymeric material.

The remarks made above as to preferred embodiments of compounds (I) and of polymers containing repeating units II, to suitable and preferred polymeric materials and optional additives and to methods for incorporating the cyclic and/or polymeric phosphines of the invention and further optional additives into the polymeric materials apply here, too.

In particular, in compound (I), m is 0. Preferably, n is 2, 3 or 4. More preferably, component (a) of the composition of the invention is pentaphenyl cyclopentaphosphine (m=0; n=3) or is a mixture of pentaphenyl cyclopentaphosphine with tetraphenyl cyclotetraphosphine (m=0; n=2) and/or hexaphenyl cyclohexaphosphine (m=0; n=4). In the latter case, pentaphenyl cyclopentaphosphine is present in an amount of preferably at least 50% by weight, more preferably at least 60% by weight, even more preferably at least 70% by weight and in particular at least 80% by weight, e.g. at least 90% by weight, based on the total weight of the cyclic phosphines.

Preferably, the polymeric composition of the invention comprises the compound (I) in an amount of from 3 to 15% by weight, more preferably from 6 to 15% by weight, e.g. from 6 to 13% by weight or from 6 to 12% by weight, and in particular from 8 to 15% by weight, e.g. from 8 to 13% by weight or from 8 to 12% by weight, based on the weight of the polymeric material.

In particular, in the polymer containing repeating units II, m is 0. Preferably, the polymer contains the repeating units II in an amount of at least 80% by weight, preferably at least 90% by weight and in particular at least 95% by weight, based on the total weight of the polymer. The maximum upper limit of the amount of repeating units II in the polymer depends on the nature of the groups terminating the polymer, such as halogen or OH.

Preferably, the polymer contains from 3 to 10,000, more preferably from 5 to 1000 and in particular from 5 to 100, e.g. 10 to 100 or 10 to 50, repeating units of formula II. The number average molecular weight $M_n$ of the polymer is preferably from 300 to 1,000,000 more preferably from 500 to 100,000, in particular from 1000 to 10,000, e.g. from 1000 to 5000.

Preferably, the polymeric composition of the invention comprises the polymer containing repeating units II in an amount of from 2 to 15% by weight, more preferably from 3 to 15% by weight, even more preferably from 6 to 15% by weight, e.g. from 6 to 13% by weight or from 6 to 12% by weight, and in particular from 8 to 15% by weight, e.g. from 8 to 13% by weight or from 8 to 12% by weight, based on the weight of the polymeric material.

If the polymeric compositions comprises both compound(s) I and polymer(s) containing repeating units II, the two components are preferably comprised in a total amount of from 2 to 15% by weight, more preferably from 3 to 15% by weight, even more preferably from 6 to 15% by weight, e.g. from 6 to 13% by weight or from 6 to 12% by weight, and in particular from 8 to 15% by weight, e.g. from 8 to 13% by weight or from 8 to 12% by weight, based on the weight of the polymeric material.

Preferably, the polymeric material is selected from the classes of polyamides, polyesters, polycarbonates, polystyrenes and other olefinics, and polyurethanes. Specifically, the polymeric material is a polycarbonate.

In a yet further aspect, the invention provides a composition comprising (a) at least one compound of formula I as defined above and/or at least one polymer containing repeating units of the formula II as defined above; and (b) a polymerizable monomer, except for monomers containing epoxide groups.

The remarks made above as to preferred embodiments of compounds (I) and of polymers containing repeating units II and to optional additives apply here, too.

The polymerizable monomer may be any of the monomers mentioned above in context with the polymeric material, provided it is compatible with at least one of the cyclic and/or polymeric phosphines of the invention. Compatible means that there are no interactions between the phosphine and the monomer which negatively influence the flame retardant properties of the polymeric material produced from the monomer of the composition.

Preferably, the composition of the invention is in the liquid or solid state at ambient temperature (25° C.). Thus, preferably, the monomers are either selected so as to be in the liquid or solid state at ambient temperature or they are dissolved in an appropriate solvent.

Preferably, the monomers are selected from alkenes, alkadienes, halogenated alkenes, halogenated alkadienes, cycloalkenes, vinylethers, vinylesters, vinylaromatic compounds, α,β-unsaturated aliphatic acids and derivatives thereof, aliphatic and cycloaliphatic polyols, mono- and polyhydroxyaromatic compounds, aldehydes, ureas, melamines, polyfunctional isocyanates, polyamines, polyacids and polyacid derivatives, carbonic esters, amino acids, lactams and mixtures thereof.

Suitable alkenes are for example ethylene, propylene, but-1-ene, isobutene, 1-pentene, 1-hexene, 4-methylpent-1-ene and the like. Preferred alkenes for the composition of the invention are not gaseous at ambient temperature and are thus preferably selected from 1-pentene, 1-hexene, 4-methylpent-1-ene and higher alkenes.

Suitable alkadienes are for example isoprene and butadiene. Preferred alkadienes for the composition of the invention are not gaseous at ambient temperature and are thus preferably selected from isoprene and higher alkadienes Suitable halogenated alkenes are for example vinylchloride, vinylfluoride, vinylidenchloride, vinylidenfluoride, allylchloride, allylbromide and the like. Preferred halogenated alkenes for the composition of the invention are not gaseous at ambient temperature and are thus preferably selected from vinylidenchloride, allylchloride, allylbromide and higher chloralkenes.

One suitable halogenated alkadiene is for example chloroprene (2-chloro-1,3-butadiene).

Suitable cycloalkenes are for example cyclopentene and norbornene.

Suitable vinylethers are for example butylvinylether, hydroxybutylvinylether, 2-ethylhexylvinylether, octylvinylether, just to name a few examples.

Suitable vinylesters are the vinyl esters of aliphatic $C_1$-$C_{20}$ carboxylic acids, such as vinylformiate, vinylacetate, vinylpropionate, vinylbutyrate, vinylhexanoate, vinyllaurate, vinylstearate and the like. The most common vinylester is vinylacetate.

Suitable vinylaromatic compounds are for example styrene, α-methylstyrene, 2-, 3- or 4-methylstyrene and the like.

Suitable α,β-unsaturated aliphatic acids and derivatives thereof are for example acrylic acid, methacrylic acid, itaconic acid, fumaric acid, maleic acid, acrylic and methacrylic esters, such as methyl, ethyl, propyl and butyl acrylate or methacrylate, itaconic esters, such as methyl, ethyl, propyl and butyl itaconate, fumaric esters, such as methyl, ethyl, propyl and butyl fumarates, maleic esters, such as methyl, ethyl, propyl and butyl maleate, acrylamide, acrylonitrile and the like.

Suitable aliphatic and cycloaliphatic polyols are for example 1,2-ethanediol, 1,2-propanediol, 1,3-propanediol, 1,4-butanediol, 1,5-pentanediol, 2,2-dimethyl-1,3-propanediol, 1,6-hexanediol, 2,2,4-trimethylpentane-1,5-diol, 1,10-decanediol, 1,2-cyclohexanediol, 1,4-cyclohexanediol, 1,2-cyclohexanedimethanol, 1,3-cyclohexanedimethanol 1,4-cyclohexanedimethanol, diethylene glycol, triethylene glycol, dipropylene glycol, tripropylene glycol and the like. Suitable higher polyhydric alcohols are, for example, trihydric (triols), tetrahydric (tetrols) and/or pentahydric alcohols (pentols). They generally have 3 to 25, preferably 3 to 18 carbon atoms. They include glycerol, trimethylolethane, trimethylolpropane, erythritol, pentaerythritol, sorbitol, and the alkoxylates thereof.

Suitable mono- and polyhydroxyaromatic compounds are for example phenol, naphthol, anthracenol, hydroquinone, resorcin, naphthoquinone, dihydroxyanthracene, pyrogallol, 2,2-bis(4-hydroxyphenyl)propane (bisphenol A), 2,2-bis(4-hydroxyphenyl)-butane (bisphenol B), 1,1-bis(4-hydroxyphenyl)-3,3,5-trimethylcyclohexane (bisphenol C) and the like.

Suitable aldehydes are for example formaldehyde, in particular in the form of formalin or trioxane, ethanal and the like.

Suitable polyfunctional isocyanates are for example aliphatic, cycloaliphatic, araliphatic and aromatic isocyanates. Suitable aromatic diisocyanates are, for example, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate and/or phenylene diisocyanate. Aliphatic and cycloaliphatic diisocyanates comprise, for example, tri-, tetra-, penta-, hexa-, hepta- and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methyl-2,4- and/or 2,6-cyclohexanediisocyanato and/or dicyclohexylmethane 4,4'-, 2,4'- and/or 2,2'-diisocyanate. The preferred diisocyanates include hexamethylene diisocyanate (HMDI) and isophorone diisocyanate. Examples of higher polyfunctional isocyanates are triisocyanates, such as triphenylmethane 4,4',4"-triisocyanate, and also the cyanurates of the aforementioned diisocyanates, and also the oligomers obtainable by partial reaction of diisocyanates with water, such as the biurets of the aforementioned diisocyanates, and, furthermore, oligomers obtainable by targeted reaction of semi-blocked diisocyanates with polyols having on average more than 2 and preferably 3 or more hydroxyl groups.

Suitable polyamines are for example alkyldiamines such as $C_2$-$C_{20}$-alkyldiamines, e.g., ethylenendiamine, propylenediamine, butylenediamine, pentylenediamine, hexamethylenediamine, or aliphatic polyamines, such as diethylenetriamine, triethyleneteramine, tetraethylenepentamine, pentaethylenehexamine and the like, or aromatic diamines, such as $C_6$ to $C_{20}$ aromatic diamines, e.g., m-, o- or p-phenylenediamine or m-xylenediamine.

Suitable polyacids and polyacid derivatives are for example terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid, the esters thereof, in particular the methyl esters, their anhydrides and chlorides.

Suitable carbonic esters are for example diphenyl carbonate, dimethyl carbonate and the like.

Suitable amino acids are for example 4-aminobutyric acid, 6-aminohexanoic acid, 11-aminoundecanoic acid and the like.

One example for a suitable lactam is ε-caprolactam.

More preferably, the polymerizable monomers are selected from lactams, amines and amides, and in particular from lactams. Specifically, the polymerizable monomer is ε-caprolactam.

The composition of the invention is generally prepared by mixing the at least one cyclic and/or olefinic phosphine of the invention (component (i)) with the monomer or monomer mixture.

The composition may further contain at least one appropriate solvent and/or at least one of the additives mentioned above for the polymeric composition. The composition may also contain a polymerization inhibitor for stabilizing monomers susceptible to premature/undesired polymerization. The suitable polymerization inhibitors are specific for the respective monomers and can be selected in each case by those skilled in the art. Also, suitable solvents depend from the specific nature of the monomer used and can be easily determined by those skilled in the art.

The flame retarding properties of the compounds (I)/the polymers containing repeating units II are determined in accordance with standard methods used to assess flame retardancy. These include the NFPA 701 Standard Methods of Fire Tests for Flame-Resistant Textiles and Films, 1989 and 1996 editions; the UL 94 Test for Flammability of Plastic Materials for Parts in Devices and Appliances, 5th Edition, Oct. 29, 1996; Limiting Oxygen Index (LOI), ASTM D-2863; and Cone calorimetry, ASTM E-1354. Ratings according to the UL 94 V test are as compiled in the following table:

| Rating | Afterflame time | Burning drips | Burn to clamp |
|---|---|---|---|
| V-0 | <10 s | no | no |
| V-1 | <30 s | no | no |
| V-2 | <30 s | yes | no |
| Fail | <30 s | | yes |
| Fail | >30 s | | no |

The following examples are meant for illustrative purposes only and are not to be construed to limit the scope of this invention.

EXAMPLES

1. Preparation of Pentaphenyl Cyclopentaphosphine (Compound (I); m=0; n=3)

716 g (4.00 mol) of dichlorophenylphosphine ($C_6H_5PCl_2$) were charged into a reactor under argon atmosphere and 5 l of THF were added. 103 g (4.259 mol) of magnesium turnings were added portionwise in the course of 1.25 h while the temperature was kept at <65° C. After the addition was completed, the reaction mixture was stirred for 140 min at 68° C. and for 3.5 days at 20° C. The mixture was filtered and the solvent was evaporated from the filtrate in a rotary evaporator. The residue was suspended in 1250 g of water and the suspension was filtered. Washing the filter cake with 3×300 ml of water and 3×300 ml of acetone and subsequent drying at 45° C. and 5 mbar yielded 366.8 g (84.87% of theory) of the title product.

2. Combustion Test

The following components were mixed by adding them to a twin-screw extruder:

| | |
|---|---|
| 60.0% by weight | polycarbonate (Makrolon 2800, Bayer) |
| 27.6% by weight | ABS (Terluran HI-10; BASF) |
| 12.0% by weight | pentaphenyl cyclopentaphosphine (compound (I); m = 0; n = 3) |
| 0.4% by weight | teflon dispersion (anti-dripping additive) |

After extrusion, the material was injection-molded into 1.6 mm thick test bars which were then subjected to the UL 94 V test.

The total burning time of the sample was 14.6 s. No burning dips and clamps were formed. This corresponds to a V-1 rating.

We claim:

1. A method comprising flame retarding or reducing the flammability of organic material by incorporating into a material at least one compound of formula I or of at least one polymer containing repeating units of the formula II or a mixture thereof

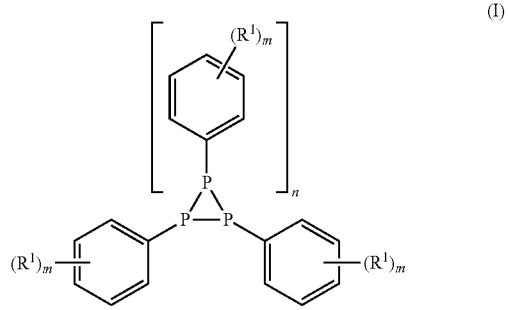

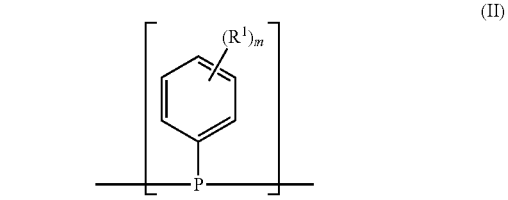

where
each $R^1$ is independently selected from the group consisting of hydroxy, $C_1$-$C_{10}$-alkyl, $C_1$-$C_{10}$-alkoxy, $C_3$-$C_{10}$-cycloalkyl, $C_3$-$C_{10}$-cycloalkoxy, $C_6$-$C_{10}$-aryloxy, alkyl, $C_6$-$C_{10}$-aryl-$C_1$-$C_4$-alkoxy, $NR^2R^3$, $COR^2$, $COOR^2$ and $CONR^2R^3$;

each $R^2$ is independently selected from the group consisting of hydrogen, $C_1$-$C_{10}$-alkyl, $C_3$-$C_{10}$-cycloalkyl, $C_6$-$C_{10}$-aryl and $C_6$-$C_{10}$-aryl-$C_1$-$C_4$-alkyl;

$R^3$ independently has one of the meanings given for $R^2$;

m is 0, 1, 2 or 3; and n is an integer from 1 to 6, wherein the organic material is not an epoxy resin or an epoxy resin containing material.

2. The method as claimed in claim 1, where n is 2, 3 or 4.

3. The method as claimed in claim 1, where each $R^1$ is independently selected from the group consisting of $C_1$-$C_{10}$-alkyl, $C_3$-$C_{10}$-cycloalkyl and $C_6$-$C_{10}$-aryl.

4. The method as claimed in claim 1, where m is 0.

5. The method as claimed in claim 1, as flame retardants in polymeric material.

6. The method as claimed in claim 5, where the polymeric material is selected from thermosetting polymers.

7. The method as claimed in claim 5, where the polymeric material is selected from thermoplastic polymers.

8. A polymeric composition comprising
(a) at least one compound of formula I or of at least one polymer containing repeating units of the formula II or a mixture thereof,

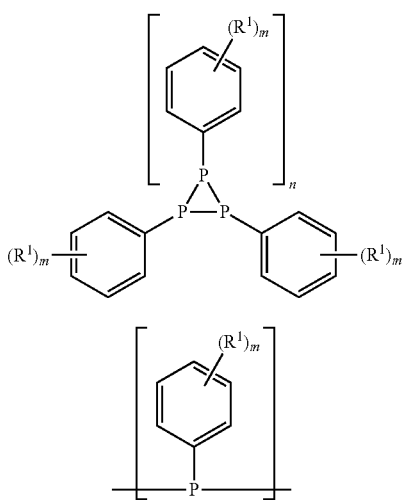

where
each $R^1$ is independently selected from the group consisting of hydroxy, $C_1$-$C_{10}$-alkyl, $C_1$-$C_{10}$-alkoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_4$-alkyl, $C_6$-$C_{10}$-aryl-$C_1$-$C_4$-alkoxy, $NR^2R^3$, $COR^2$, $COOR^2$ and $CONR^2R^3$;
each $R^2$ is independently selected from the group consisting of hydrogen, $C_1$-$C_{10}$-alkyl, $C_3$-$C_{10}$-cycloalkyl, $C_6$-$C_{10}$-aryl and $C_6$-$C_{10}$-aryl-$C_1$-$C_4$-alkyl;
$R^3$ independently has one of the meanings given for $R^2$;
m is 0, 1, 2 or 3; and
n is an integer from 1 to 6 and
(b) a polymeric material, except for epoxy resins and epoxy resins containing materials;

where the component (a) is comprised in an amount of from 6 to 15% by weight, based on the weight of the polymeric material.

9. A composition comprising
(i) at least one compound of formula I or of at least one polymer containing repeating units of the formula II or a mixture thereof,

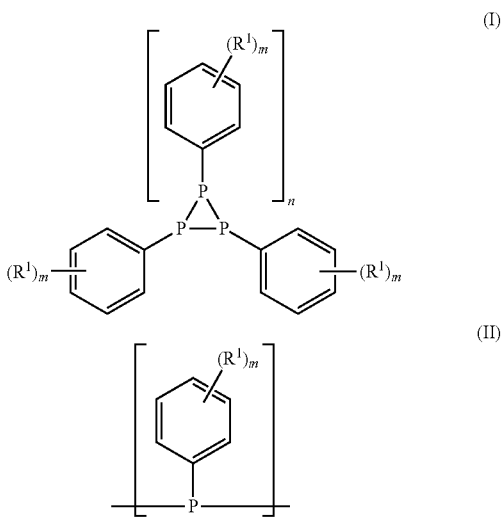

where
each $R^1$ is independently selected from the group consisting of hydroxy, $C_1$-$C_{10}$-alkyl, $C_1$-$C_{10}$-alkoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_4$-alkyl, $C_6$-$C_{10}$-aryl-$C_1$-$C_4$-alkoxy, $NR^2R^3$, $COR^2$, $COOR^2$ and $CONR^2R^3$;
each $R^2$ is independently selected from the group consisting of hydrogen, $C_1$-$C_{10}$-alkyl, $C_3$-$C_{10}$-cycloalkyl, $C_6$-$C_{10}$-aryl and $C_6$-$C_{10}$-aryl-$C_1$-$C_4$-alkyl;
$R^3$ independently has one of the meanings given for $R^2$;
m is 0, 1, 2 or 3; and
n is an integer from 1 to 6 and
(ii) at least one polymerizable monomer, except for monomers containing epoxide groups, wherein the monomer is selected from the group consisting of an alkadiene, halogenated alkene, halogenated alkadiene, cycloalkene, vinylether, vinylester, vinylaromatic compound, α,β-unsaturated aliphatic acids and derivative thereof, aliphatic and cycloaliphatic polyol, mono- and polyhydroxyaromatic compound, aldehyde, urea, melamine, polyfunctional isocyanates, polyamine, polyacid and polyacid derivative, carbonic ester, amino acid, lactam and mixtures thereof.

* * * * *

UNITED STATES PATENT AND TRADEMARK OFFICE
CERTIFICATE OF CORRECTION

PATENT NO.         : 8,519,035 B2
APPLICATION NO.    : 12/676495
DATED              : August 27, 2013
INVENTOR(S)        : Tishkov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 735 days.

Signed and Sealed this
Fifteenth Day of September, 2015

Michelle K. Lee
*Director of the United States Patent and Trademark Office*